(12) United States Patent
Nakagami

(10) Patent No.: US 11,336,909 B2
(45) Date of Patent: May 17, 2022

(54) IMAGE PROCESSING APPARATUS AND METHOD

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 33 days.

(21) Appl. No.: 16/468,188

(22) PCT Filed: Dec. 14, 2017

(86) PCT No.: PCT/JP2017/044841
§ 371 (c)(1),
(2) Date: Jun. 10, 2019

(87) PCT Pub. No.: WO2018/123608
PCT Pub. Date: May 7, 2018

(65) Prior Publication Data
US 2019/0387238 A1      Dec. 19, 2019

(30) Foreign Application Priority Data

Dec. 27, 2016  (JP) .............................. JP2016-253065

(51) Int. Cl.
*H04N 19/80*     (2014.01)
*H04N 19/40*     (2014.01)
(Continued)

(52) U.S. Cl.
CPC ............. *H04N 19/40* (2014.11); *H04N 19/48* (2014.11); *H04N 19/70* (2014.11); *H04N 19/174* (2014.11)

(58) Field of Classification Search
CPC combination set(s) only.
See application file for complete search history.

(56) References Cited

U.S. PATENT DOCUMENTS

| 8,817,881 B1 * | 8/2014 | Yano ...................... H04N 5/265 |
| | | 375/240.16 |
| 2003/0163781 A1 * | 8/2003 | Visharam ........... H04N 21/8451 |
| | | 715/201 |

(Continued)

FOREIGN PATENT DOCUMENTS

| CN | 1650627 A | 8/2005 |
| CN | 105308672 A | 2/2016 |

(Continued)

OTHER PUBLICATIONS

Skupin, Motion-Constrained Tile Sets Extraction Information SEI Messages Draft 1, Joint Collaborative Team on Video Coding (JCT-VC) of ITU-T SG 16 WP 3 and ISO/IEC JTC 1/SC 29/WG 11, Oct. 14-21, 2016, pp. 1-5, 25th Meeting, Chengdu, CN.

(Continued)

*Primary Examiner* — Cindy Trandai
(74) *Attorney, Agent, or Firm* — Paratus Law Group, PLLC

(57) ABSTRACT

There is provided an image processing apparatus and an image processing method that are capable of inhibiting increase of a load of decoding. Metadata extracted from coded data of a moving image is updated in accordance with coded data of a partial area of the moving image extracted from the coded data of the moving image. For example, slice-basis metadata corresponding to each slice included in the partial area is updated. The present disclosure can be applied to, for example, an image processing apparatus, a data conversion apparatus, an image coding apparatus, an image decoding apparatus, a communication apparatus, and the like.

7 Claims, 28 Drawing Sheets

(51) Int. Cl.
*H04N 19/48* (2014.01)
*H04N 19/70* (2014.01)
*H04N 19/174* (2014.01)

(56) References Cited

U.S. PATENT DOCUMENTS

| | | | | |
|---|---|---|---|---|
| 2003/0233379 A1* | 12/2003 | Cohen | G06F 16/10 | |
| 2009/0161973 A1* | 6/2009 | Stefanov | H04N 19/93 | 382/246 |
| 2010/0232504 A1* | 9/2010 | Feng | H04N 19/70 | 375/240.13 |
| 2013/0003868 A1* | 1/2013 | Sjoberg | A63B 53/047 | 375/240.26 |
| 2013/0016771 A1* | 1/2013 | Misra | H04N 19/43 | 375/240.03 |
| 2013/0128949 A1* | 5/2013 | Sezer | H04N 19/50 | 375/240.02 |
| 2013/0215016 A1* | 8/2013 | Moriyoshi | H04N 19/61 | 345/156 |
| 2013/0294500 A1* | 11/2013 | Wang | H04N 19/70 | 375/240.02 |
| 2014/0092977 A1* | 4/2014 | Lainema | H04N 19/59 | 375/240.16 |
| 2014/0098883 A1* | 4/2014 | Hannuksela | H04N 19/80 | 375/240.16 |
| 2014/0301477 A1* | 10/2014 | Deshpande | H04N 19/152 | 375/240.25 |
| 2014/0341285 A1* | 11/2014 | Sakurai | H04N 13/128 | 375/240.12 |
| 2014/0362098 A1* | 12/2014 | Kerofsky | G06T 1/60 | 345/547 |
| 2015/0020102 A1* | 1/2015 | Yoo | H04N 21/25891 | 725/41 |
| 2015/0208103 A1* | 7/2015 | Guntur | H04N 19/436 | 725/61 |
| 2015/0264390 A1* | 9/2015 | Laroche | H04N 19/52 | 375/240.16 |
| 2015/0312580 A1* | 10/2015 | Hannuksela | H04N 19/46 | 375/240.02 |
| 2015/0313578 A1* | 11/2015 | Yu | A61B 8/466 | 600/459 |
| 2016/0142722 A1* | 5/2016 | Maeda | H04N 19/105 | 375/240.08 |
| 2016/0150241 A1* | 5/2016 | Hirabayashi | H04N 21/2358 | 375/240.21 |
| 2016/0156943 A1* | 6/2016 | Hattori | H04N 21/26258 | 725/116 |
| 2016/0182927 A1* | 6/2016 | Denoual | H04N 21/234345 | 725/109 |
| 2016/0255352 A1* | 9/2016 | Pu | H03M 7/40 | 375/240.24 |
| 2017/0034532 A1* | 2/2017 | Yamamoto | H04N 19/61 | |
| 2017/0201757 A1* | 7/2017 | Goldman | H04N 19/46 | |
| 2018/0124462 A1* | 5/2018 | Lim | H04N 21/440245 | |
| 2018/0352219 A1* | 12/2018 | Maze | H04N 19/176 | |

FOREIGN PATENT DOCUMENTS

| | | |
|---|---|---|
| CN | 105580370 A | 5/2016 |
| JP | 2009-194920 A | 8/2009 |
| JP | 2016-103808 A | 6/2016 |
| JP | 2016-519516 A | 6/2016 |
| WO | WO 2012/060459 A1 | 5/2012 |
| WO | 2015/053287 A1 | 4/2015 |

OTHER PUBLICATIONS

Skupin et al., On MCTS extraction, Joint Collaborative Team on Video Coding (JCT-VC) of ITU-T SG 16 WP 3 and ISO/IEC JTC 1/SC 29/WG 11, Oct. 14-21, 2016, pp. 1-5, 25th Meeting, Chengdu, CN.

Hattori et al., HLS: Extensions to Temporal Motion-constrained tile sets SEI message, Joint Collaborative Team on Video Coding (JCT-VC) of ITU-T SG 16 WP 3 and ISO/IEC JTC 1/SC 29/WG 11, Oct. 23-Nov. 1, 2013, pp. 1-3, 15$^{th}$ Meeting: Geneva, CH.

Hattori et al., HLS: Extensions to Temporal Motion-constrained tile sets SEI message, Joint Collaborative Team on Video Coding (JCT-VC) of ITU-T SG 16 WP 3 and ISO/IEC JTC 1/SC 29/WG 11, Jan. 9-17, 2014, pp. 1-9, 16$^{th}$ Meeting: San José.

\* cited by examiner

FIG. 7

| | |
|---|---|
| tiles_enabled_flag | u(1) |
| entropy_coding_sync_enabled_flag | u(1) |
| if(tiles_enabled_flag) { | |
| num_tile_columns_minus1 | ue(v) |
| num_tile_rows_minus1 | ue(v) |
| uniform_spacing_flag | u(1) |
| if(!uniform_spacing_flag) { | |
| for (i=0; i<num_tile_columns_minus1; i++) | |
| column_width_minus1[i] | ue(v) |
| for (i=0; i<num_tile_rows_minus1; i++) | |
| row_height_minus1[i] | ue(v) |
| } | |
| loop_filter_across_tiles_enabled_flag | u(1) |
| } | |

FIG. 9

| slice_segment_header() { | Descriptor |
|---|---|
|   first_slice_segment_in_pic_flag | u(1) |
|   if(nal_unit_type>=BLA_W_LP && nal_unit_type<=RSV_IRAP_VCL23) | |
|     no_output_of_prior_pics_flag | u(1) |
|   slice_pic_parameter_set_id | ue(v) |
|   if(!first_slice_segment_in_pic_flag) { | |
|     if(dependent_slice_segments_enabled_flag) | |
|       dependent_slice_segment_flag | u(1) |
|     slice_segment_address | u(v) |
|   } | |
|   if(!dependent_slice_segment_flag) { | |
|     for(i=0;i<num_extra_slice_header_bits;i++) | |
|       slice_reserved_flag[i] | u(1) |
|     slice_type | ue(v) |
|     if(output_flag_present_flag) | |
|       pic_output_flag | u(1) |
|     if(separate_colour_plane_flag==1) | |

A

| | |
|---|---|
|   } | |
|   if(tiles_enabled_flag || entropy_coding_sync_enabled_flag) { | |
|     num_entry_point_offsets | ue(v) |
|     if(num_entry_point_offsets>0) { | |
|       offset_len_minus1 | ue(v) |
|       for(i=0;i<num_entry_point_offsets;i++) | |
|         entry_point_offset_minus1[i] | u(v) |
|     } | |
|   } | |

B

FIG. 13
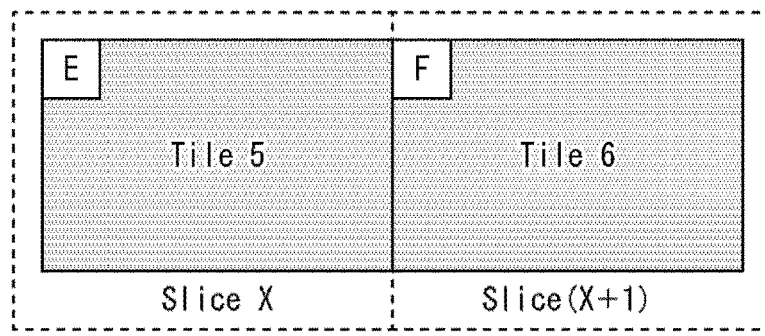
A
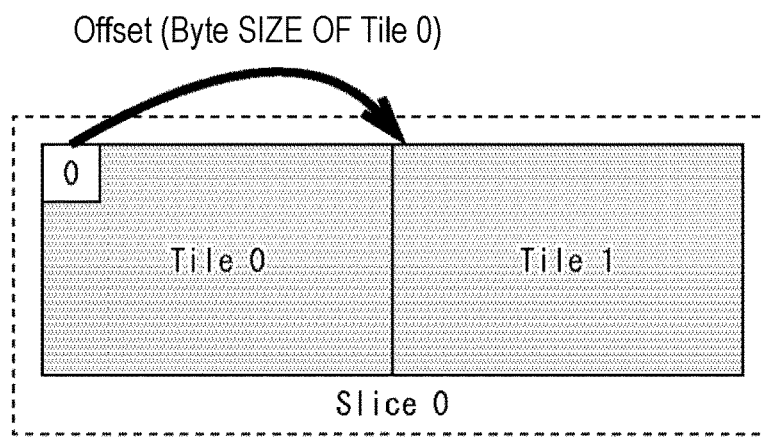
B

FIG. 14

A
- first_slice_segment_in_pic_flag = 1
- slice_segment_address = 0
- num_entry_point_offsets = 1
- offset_len_minus1 = VALUE CORRESPONDING TO Byte SIZE OF Tile 0
- entry_point_offset_minus1[0] = Byte SIZE OF Tile 0

B
- first_slice_segment_in_pic_flag = 1
- slice_segment_address = 0
- num_entry_point_offsets = N-1
- offset_len_minus1 = VALUE CORRESPONDING TO Byte SIZE OF Tiles 0 to (N-1)
- entry_point_offset_minus1[0] = Byte SIZE OF Tile 0
- entry_point_offset_minus1[1] = Byte SIZE OF Tile 1
- ...
- entry_point_offset_minus1[N-2] = Byte SIZE OF Tile (N-2)

FIG. 15
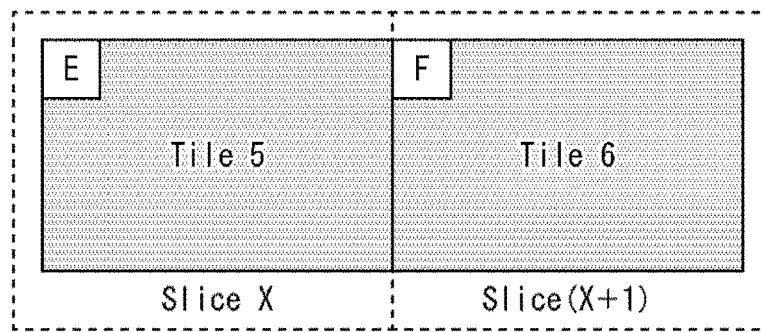
A
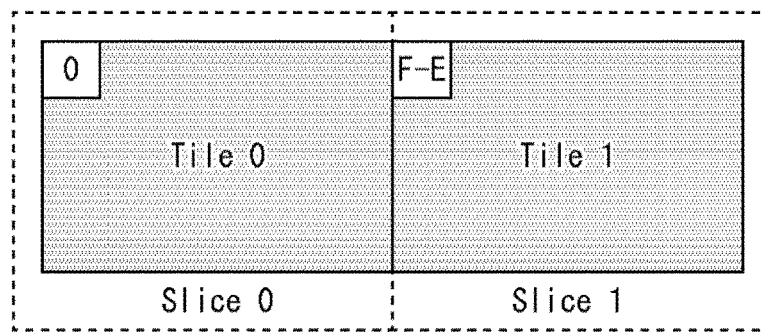
B

FIG. 17
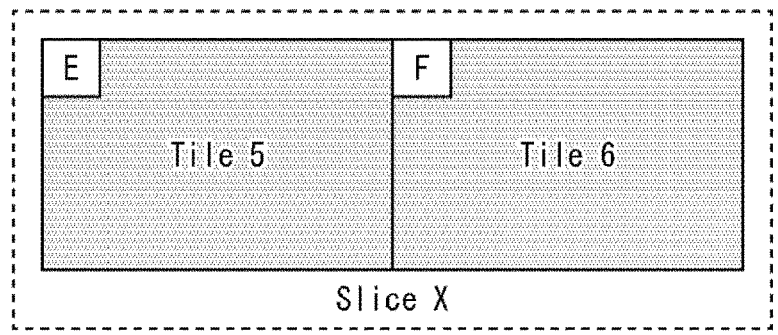
A
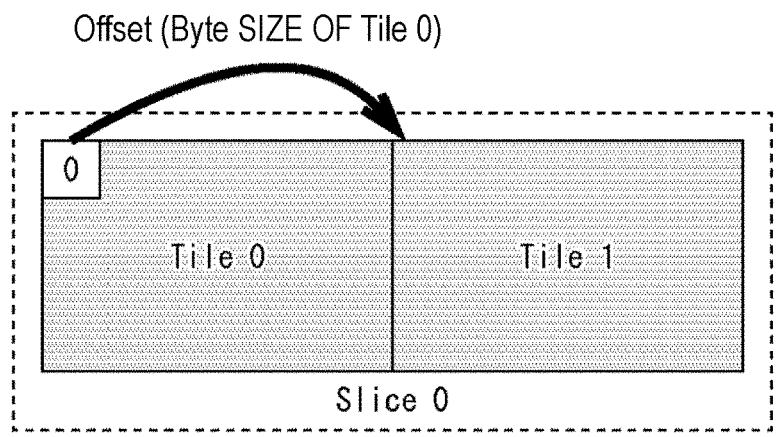
B
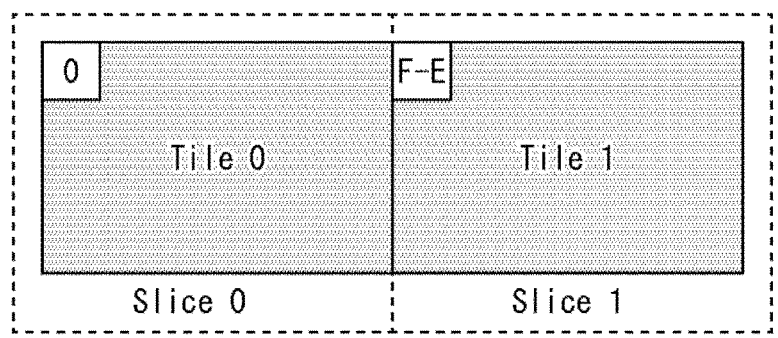
C

FIG. 18
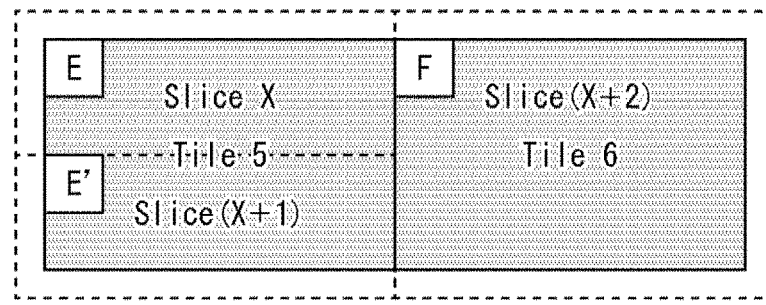
A
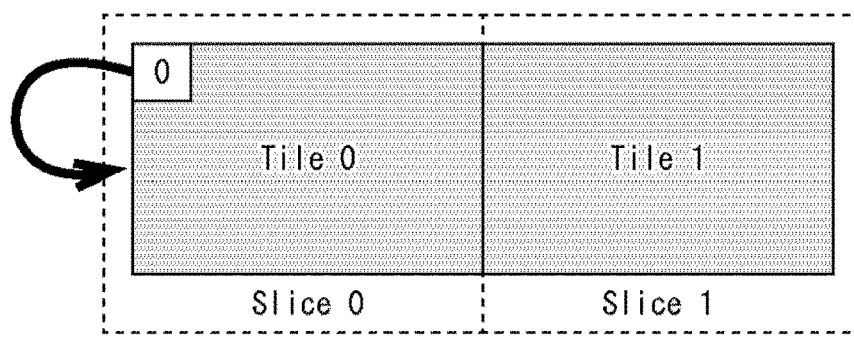
B
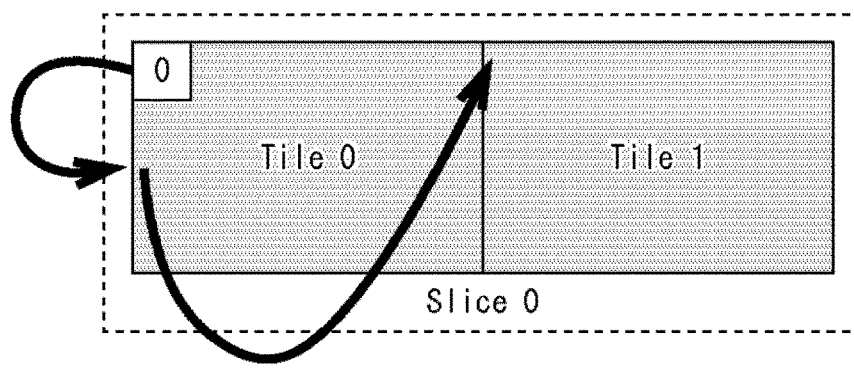
C

FIG. 19

A
- first_slice_segment_in_pic_flag = 1
- slice_segment_address = 0
- num_entry_point_offsets = 1
- offset_len_minus1 = VALUE CORRESPONDING TO Byte SIZE OF ORIGINAL Slices X TO (X + 1)
- entry_point_offset_minus1[0] = Byte SIZE OF ORIGINAL Slice X

B
- first_slice_segment_in_pic_flag = 1
- slice_segment_address = 0
- num_entry_point_offsets = N-1 (NUMBER OF SLICES)
- offset_len_minus1 = VALUE CORRESPONDING TO Byte SIZE OF ORIGINAL Slices X TO (X + N - 1)
- entry_point_offset_minus1[0] = Byte SIZE OF ORIGINAL Slice X
- entry_point_offset_minus1[1] = Byte SIZE OF ORIGINAL Slice (X + 1)
- ...
- entry_point_offset_minus1[N-2] = Byte SIZE OF ORIGINAL Slice (X + N - 2)

FIG. 20
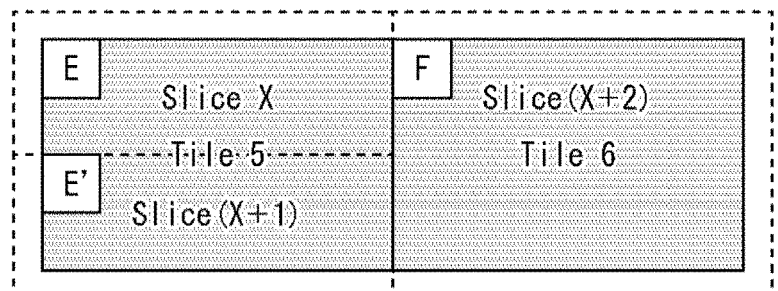
A
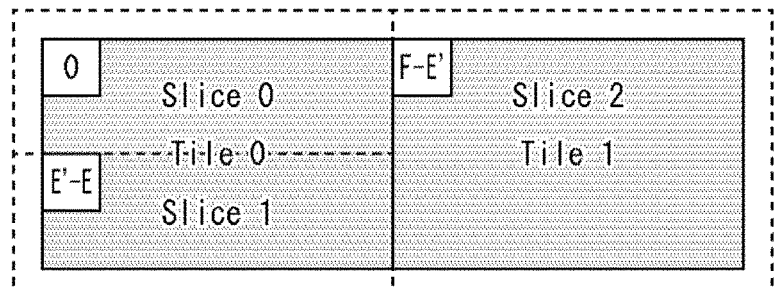
B

FIG. 23

| | Descriptor |
|---|---|
| temporal_motion_constrained_tile_sets(payloadSize) { | |
|   mc_all_tiles_exact_sample_value_match_flag | u(1) |
|   each_tile_one_tile_set_flag | u(1) |
|   if(!each_tile_one_tile_set_flag) { | |
|     limited_tile_set_display_flag | u(1) |
|     num_sets_in_message_minus1 | ue(v) |
|     for(i=0; i<=num_sets_in_message_minus1; i++) { | |
|       mcts_id[i] | ue(v) |
|       if(limited_tile_set_display_flag) | |
|         display_tile_set_flag[i] | u(1) |
|       num_tile_rects_in_set_minus1[i] | ue(v) |
|       for(j=0; j<=num_tile_rects_in_set_minus1[i]; j++) { | |
|         top_left_tile_index[i][j] | ue(v) |
|         bottom_right_tile_index[i][j] | ue(v) |
|       } | |
|       if(!mc_all_tiles_exact_sample_value_match_flag) | |
|         mc_exact_sample_value_match_flag[i] | u(1) |
|       mcts_tier_level_idc_present_flag[i] | u(1) |
|       if(mcts_tier_level_idc_present_flag[i]) { | |
|         mcts_tier_flag[i] | u(1) |
|         mcts_level_idc[i] | u(8) |
|       } | |
|     } | |
|   } else { | |
|     max_mcs_tier_level_idc_present_flag | u(1) |
|     if(mcts_max_tier_level_idc_present_flag) { | |
|       mcts_max_tier_flag | u(1) |
|       mcts_max_level_idc | u(8) |
|     } | |
|   } | |
| } | |

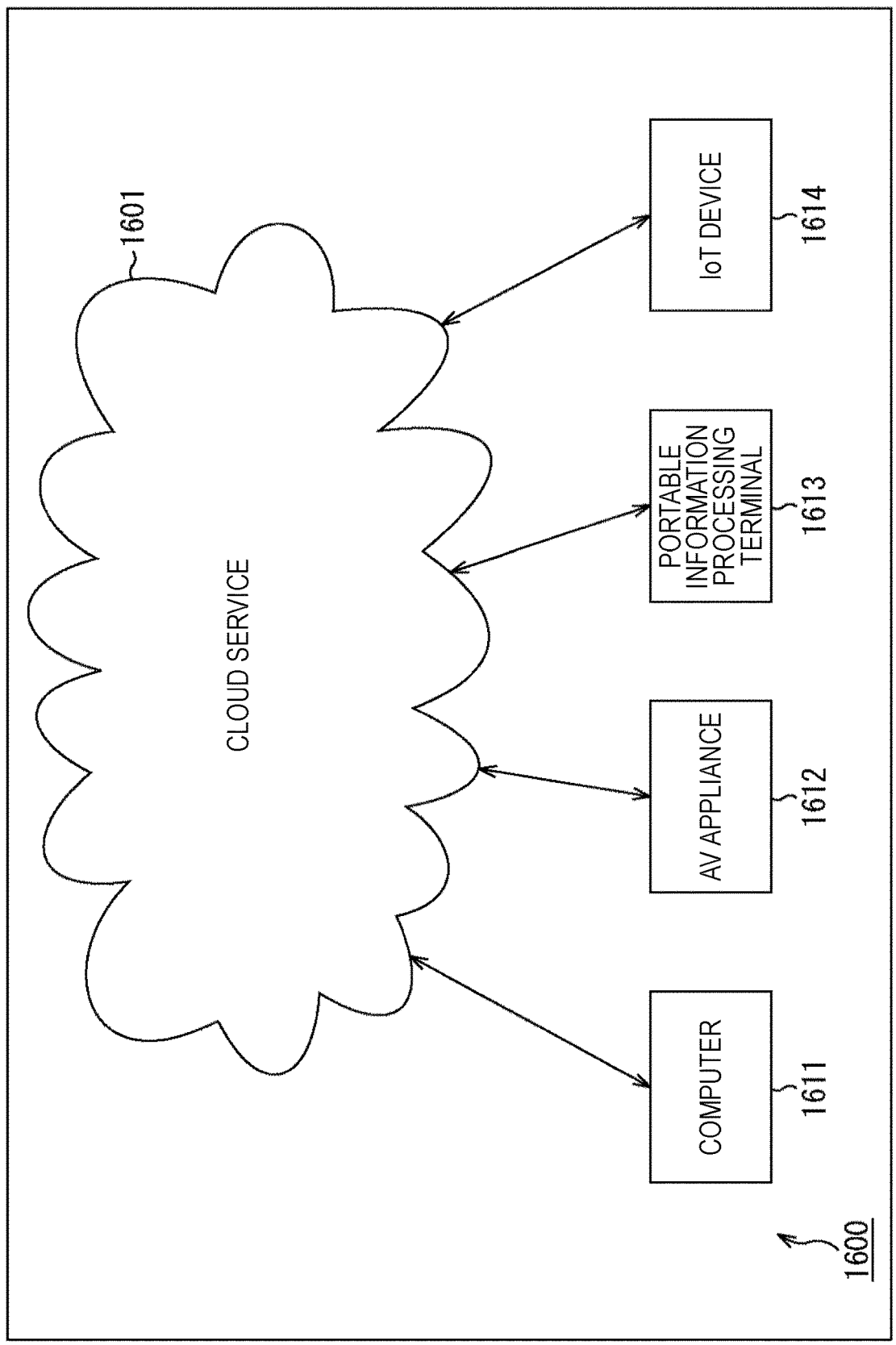

IMAGE PROCESSING APPARATUS AND METHOD

CROSS REFERENCE TO PRIOR APPLICATION

This application is a National Stage patent application of PCT International Patent Application No. PCT/JP2017/044841 (filed on Dec. 14, 2017) under 35 U.S.C. § 371, which claims priority to Japanese Patent Application No. 2016-253065 (filed on Dec. 27, 2016), which are all hereby incorporated by reference in their entirety.

TECHNICAL FIELD

The present disclosure relates to an image processing apparatus and an image processing method, and more particularly, to an image processing apparatus and an image processing method that are capable of inhibiting increase of a load of decoding.

BACKGROUND ART

Conventionally, in high efficiency video coding (HEVC), it has been considered that an independently decodable partial area is set as a tile set by using a tile (Tile) structure to perform management by motion constrained tile set supplemental enhancement information (MCTS SET) (e.g., see Non-Patent Documents 1 and 2).

Owing to being independently decodable, extraction of coded data of a part of tile sets from coded data of a moving image enables an image of the part of tile sets to be obtained by decoding the coded data of the part of tile sets. That is, providing the coded data of the part of tile sets extracted in such a way to a decoding side enables reduction of a code amount of the coded data to be provided to the decoding side.

CITATION LIST

Non-Patent Document

Non-Patent Document 1: R. Skupin, "Motion-Constrained Tile Sets Extraction Information SEI Messages Draft 1", JGTVC-Y1008, Joint Collaborative Team on Video Coding (JGT-VC) of ITU-T SG 16 WP 3 and ISO/IEC JTC 1/SC 29/KG 11 25th Meeting: Chengdu, CN, Oct. 14-21, 2016 Non-Patent Document 2: R. Skupin, Y. Sanchez, K. Gruneberg, C. Helige, T. Schierl, "On MCTS extraction", JGTVC-Y0031, Joint Collaborative Team on Video Coding (JCT-VC) of ITU-T SG 16 WP 3 and ISO; IEC JTC 1/SC 29/WG 11 25th Meeting: Chengdu, CN, Oct. 14-21, 2016

SUMMARY OF THE INVENTION

Problems to be Solved by the Invention

Mere extraction of coded data of a part of tile sets, however, maintains metadata as it is before the extraction, and there has been a possibility that the metadata fails to appropriately match the coded data of the part of tile sets after the extraction. Consequently, there has been a possibility that a load of decoding the coded data of the part of tile sets after the extraction is increased.

The present disclosure has been made in view of such a situation, and can inhibit increase of a load of decoding.

Solutions to Problems

An image processing apparatus according to one aspect of the present technology includes a metadata updating unit that updates metadata extracted from coded data of a moving image in accordance with coded data of a partial area of the moving image extracted from the coded data of the moving image.

The metadata updating unit can update slice-basis metadata corresponding to each slice included in the partial area.

The metadata updating unit can update information, regarding an address of the slice, contained in the slice-basis metadata.

The metadata updating unit can update information, regarding an offset of a tile, contained in the slice-basis metadata in response to change of a tile configuration in the slice.

The metadata updating unit can add or delete the slice-basis metadata in response to change of a slice configuration in a picture.

The metadata updating unit can update picture-basis metadata.

The metadata updating unit can update information, regarding a tile set, contained in the picture-basis metadata in response to change of a tile configuration in an independently decodable tile set.

The metadata updating unit can update information, regarding a tile configuration in a tile set, contained in the picture-basis metadata in response to change of a tile configuration in an independently decodable tile set.

The metadata updating unit can update upper metadata equal to or greater than a sequence level.

The metadata updating unit can update information, regarding an image frame, contained in the upper metadata in accordance with a size of the partial area.

The metadata updating unit can delete metadata regarding an independently decodable tile set.

A metadata extracting unit that extracts metadata from coded data of the moving image is further included, and the metadata updating unit can update the metadata extracted by the metadata extracting unit.

The metadata extracting unit can extract upper metadata equal to or greater than a sequence level.

The metadata extracting unit can extract picture-basis metadata.

A data extracting unit that extracts coded data of the partial area from coded data of the moving image is further included, and the metadata updating unit can update metadata contained in coded data of the partial area extracted by the data extracting unit.

The metadata updating unit can update slice-basis metadata contained in coded data of the partial area.

The data extracting unit can extract coded data of an independently decodable partial area.

The data extracting unit can extract coded data of the partial area only in a case where the partial area is rectangular.

In a case where the partial area is non-rectangular, the data extracting unit can update extracted coded data to make the partial area rectangular.

An image processing method according to one aspect of the present technology includes updating metadata extracted from coded data of a moving image in accordance with coded data of a partial area of the moving image extracted from the coded data of the moving image.

In an image processing apparatus and an image processing method according to one aspect of the present technology, metadata extracted from coded data of a moving image is updated in accordance with coded data of a partial area of the moving image extracted from the coded data of the moving image.

Effects of the Invention

According to the present disclosure, an image can be processed. In particular, increase of a load of decoding can be inhibited.

BRIEF DESCRIPTION OF DRAWINGS

FIG. 7 illustrates an example of a syntax updated by a picture parameter set.
FIG. 9 illustrates an example of a syntax updated by a slice header.
FIG. 13 illustrates an example of the tile configuration after extraction.
FIG. 14 illustrates an example of parameters to be updated.
FIG. 15 illustrates an example of the tile configuration after extraction.
FIG. 17 illustrates an example of the tile configuration after extraction.
FIG. 18 illustrates an example of the tile configuration after extraction.
FIG. 19 illustrates an example of parameters to be updated.
FIG. 20 illustrates an example of the tile configuration after extraction.
FIG. 23 illustrates an example of a syntax of MCTS SEI.
FIG. 28 is a block diagram illustrating one example of a schematic configuration of a network system.

MODE FOR CARRYING OUT THE INVENTION

Hereinafter, embodiments for carrying out the present disclosure (hereinafter referred to as embodiments) will be described. Note that the description will be given in the following order.
1. MCTS SEI and Extraction of Partial Area
2. First Embodiment (Metadata Conversion Accompanying Data Extraction)
3. Second Embodiment (Restriction on Tile Set)
4. Others 1. MCTS SEI and Extraction of Partial Area Conventionally, as described in, for example, Non-Patent Documents 1 and 2, in high efficiency video coding (HEVC), it has been considered that an independently decodable partial area is set as a tile set by using a tile (Tile) structure to perform management by motion constrained tile set supplemental enhancement information (MCTS SEI).

Figure 1:
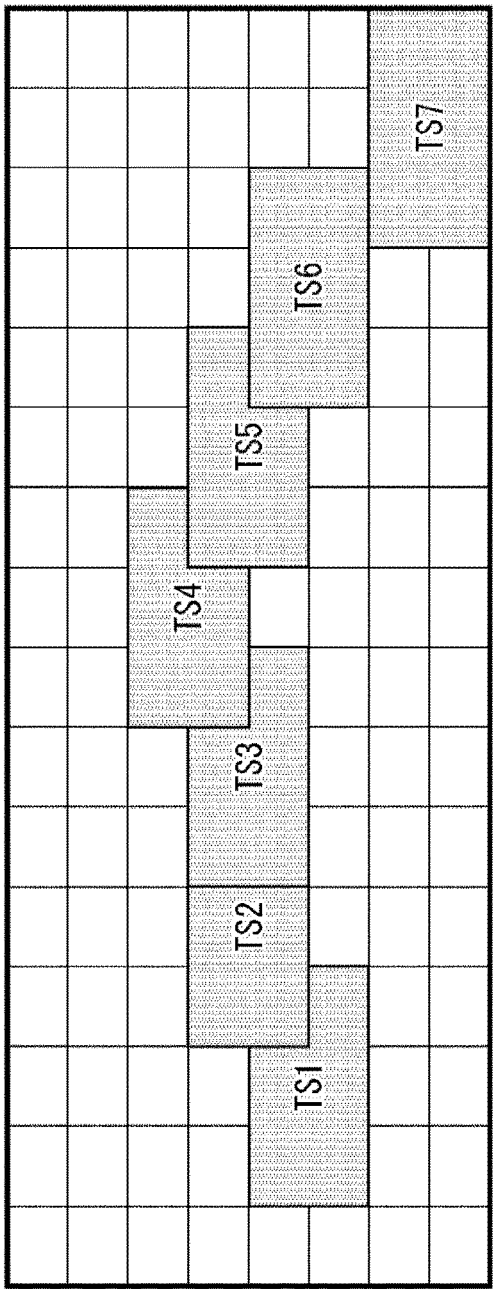
FIG. 1 illustrates an example of how tile-set extraction is.

Owing to being independently decodable, it is considered that an image of a partial area can be obtained by decoding only coded data of the partial area having a tile set as a minimum basis. For example, as illustrated in FIG. 1, in a moving image having a frame size (resolution) of 8K×4K, a moving image having a frame size of 2K×1K, which has a frame of tile sets TS1 to TS7, can be obtained by decoding coded data of the tile set ISI of a certain frame, decoding coded data of the tile set TS2 of the next frame, decoding coded data of the tile set TS3 of the next frame, decoding coded data of the tile set TS4 of the next frame, decoding coded data of the tile set TS5 of the next frame, decoding coded data of the tile set TS6 of the next frame, and decoding coded data of the tile set TS7 of the next frame.

In obtaining such a 2K×1K moving image, coded data of an area other than the tile sets TS1 to TS7 is unnecessary. Furthermore, coded data of an original moving image is independently decodable in each tile set, and thus coded data of a partial area as described above can be extracted from the coded data of the original moving image. That is, the coded data of the 2K×1K moving image can be provided to the decoding side.

Figure 2:
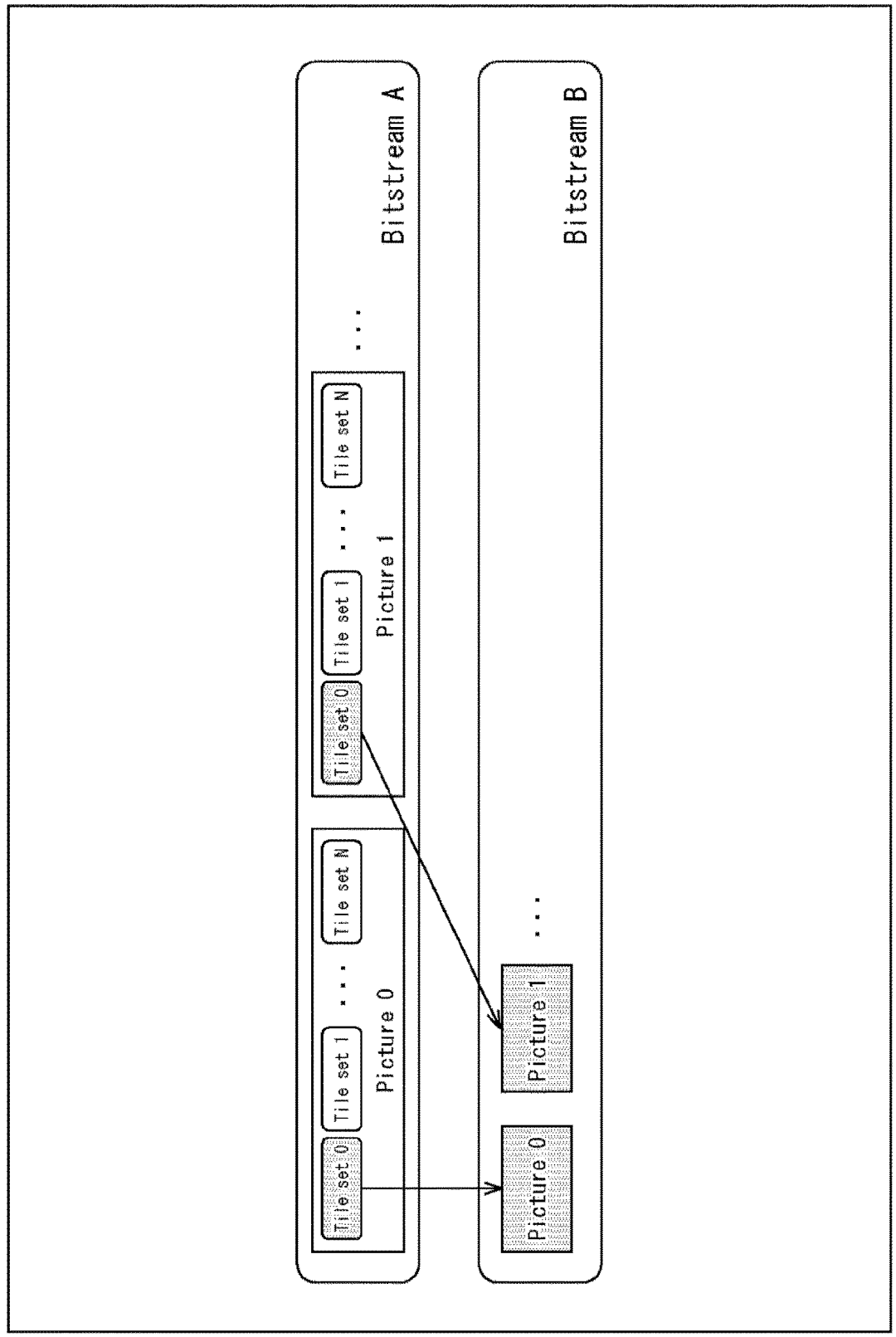
FIG. 2 illustrates an example of how the tile-set extraction is.

For example, as illustrated in FIG. 2, a tile set 0 (Tile set 0) of each picture is extracted from a bitstream A (Bitstream A) to generate a bitstream B (Bitstream B). In the bitstream A, each picture includes a plurality of tile sets p (Tile sets 0 to N). The bitstream B has the extracted tile sets 0 as a picture.

This configuration enables reduction in a code amount of coded data to be provided to the decoding side compared to that in a case where coded data of the original moving image is provided. This configuration enables inhibition of, for example, increase of a load (e.g., a processing amount, a buffer amount, a processing duration, and the like) regarding sending on a sending side. Furthermore, increase of a load (e.g., the bandwidth occupancy and the occupation duration) on a communication medium that transmits coded data and a load (e.g., the storage capacity, the bandwidth occupancy of an input/output bus of the storage medium, and the occupation duration) on a storage medium in which coded data is stored can be inhibited. Moreover, increase of a load (e.g., a processing amount, a buffer amount, a processing duration, and the like) regarding reception on a receiving side can be inhibited.

Mere extraction of coded data of a part of tile sets, however, maintains metadata as it is before the extraction, and there has been a possibility that the metadata fails to appropriately match the coded data of the part of tile sets after the extraction. If the metadata is maintained as it is before extraction, the extracted coded data is managed as coded data of a partial area of an original moving image. There has been a possibility that the decoding side is required to have unnecessarily high performance. For example, in the case of FIG. 1, the profile level (Level) of the coded data of the 8K×1K moving image is 6.2, and the profile level of the coded data of a 2K×1K tile set is 4.2. That is, the original profile level of the coded data of a tile set after extraction is 4.2. If treated as a partial area of coded data of the original moving image, the profile level increases to 6.2. Consequently, there has been a possibility that decoders capable of decoding the coded data is unnecessarily limited.

Furthermore, for example, changes of a slice or a tile in a picture due to extraction of a partial area and changes of a tile configuration in the slice cannot be dealt with. This causes the configuration of metadata in terms of management not to match the actual configuration of the coded data. There has been a possibility of difficulty in correct decoding. In other words, for correct decoding, processing for grasping and correcting such mismatch between metadata and coded data is needed in the decoding, and there has been a possibility that a load of decoding is increased.

Consequently, metadata extracted from the coded data of the moving image is updated in accordance with the coded data of the partial area of the moving image extracted from the coded data of the moving image. For example, an image processing apparatus is formed such that the image processing apparatus includes a metadata updating unit that updates metadata extracted from the coded data of the moving image in accordance with the coded data of the partial area of the moving image extracted from the coded data of the moving image. This configuration enables metadata to appropriately match the coded data of the partial area after extraction. Consequently, increase of a load of decoding can be inhibited.

For example, the metadata updating unit may update slice basis metadata corresponding to each slice included in the partial area. This operation enables information of the each-slice-basis metadata to appropriately match coded data of the slice.

Note that any slice-basis metadata is used. For example, a slice header may be used. Generally, as a bitstream A (Bitstream A) illustrated in A of FIG. 3, coded data of a moving image coded by HEVC includes upper metadata such as a video parameter set (VPS) and a sequence parameter set (SPS), metadata such as a supplemental enhancement information network abstraction layer (SEI NAL) including MCTI SEI and the like, and information of each picture. Each picture includes a picture parameter set (PPS), which is metadata, and information of each slice (Slices 0 to K. Each slice includes a slice header (Slice Header), which is metadata, and slice data (Slice Data), which is coded data of an image in the slice.

Figure 3:
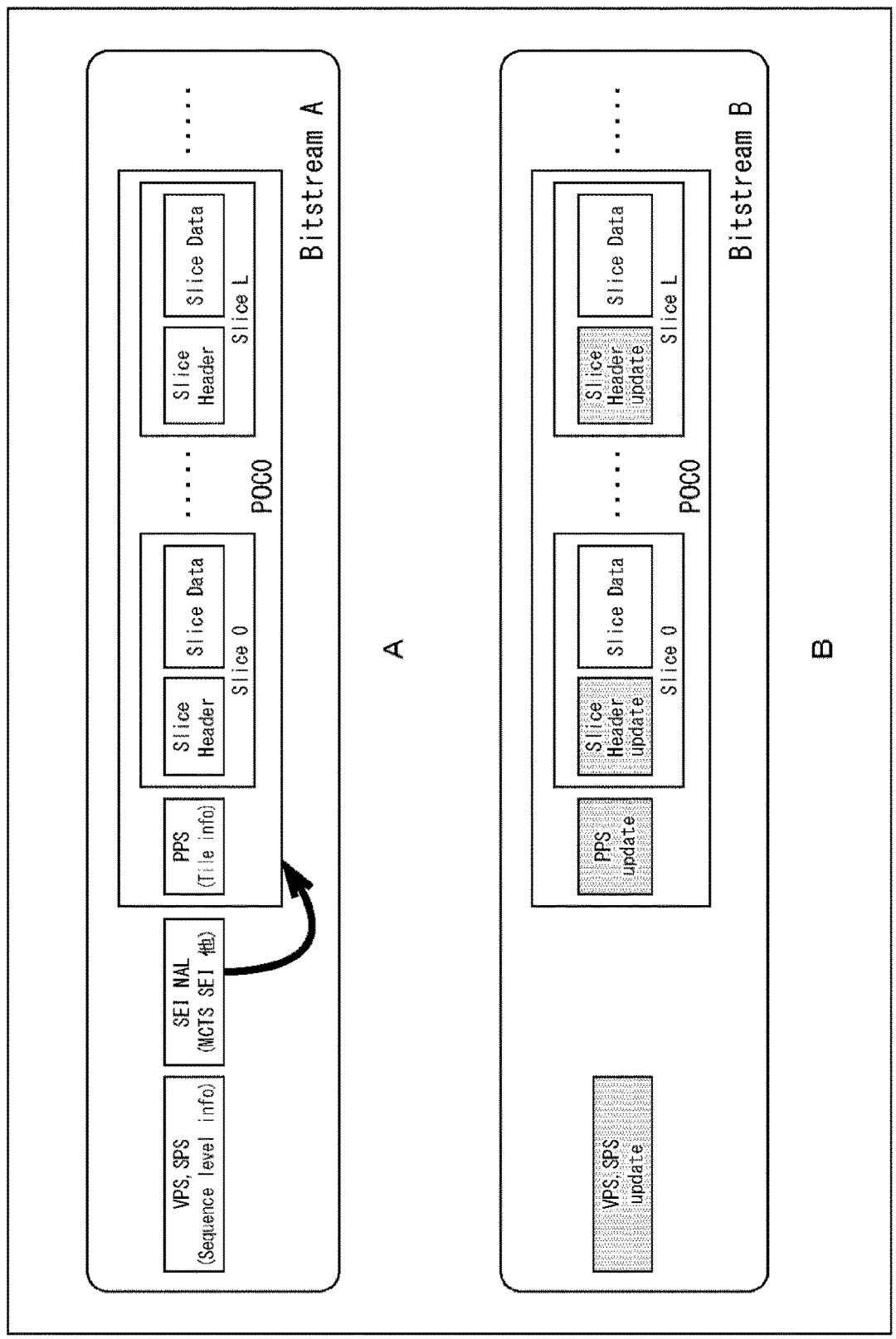
FIG. 3 illustrates an example of how data update accompanying the tile-set extraction is.

Generating the bitstream B (Bitstream B) by extracting a part of slices from the bitstream A (Bitstream A) having such a configuration causes the bitstream B to have a configuration as illustrated in, for example, B of FIG. 3. That is, the basic configuration is similar to that of the bitstream A. A slice header is provided as metadata for each slice. Updating such a slice header (Slice Header) of each slice (Slice Header update) enables information contained in the slice header to match slice data corresponding to the slice header.

For example, the metadata updating unit may update information, regarding the address of the slice, contained in the slice-basis metadata. This update enables information regarding the address of the slice to appropriately match the slice data, for example, to match changes of a slice configuration in the picture and the like. Note that any information regarding the address of a slice is used. For example, information regarding the address of a head block of a head tile in a slice may be used.

For example, the metadata updating unit may update information, regarding an offset of a tile, contained in the slice-basis metadata in response to change of the tile configuration in the slice. This update enables information regarding an offset of the tile to appropriately match the coded data of the slice, for example, to match changes of a tile configuration in the slice and the like. Note that any information regarding an offset of a tile is used. For example, information regarding the offset from the head of each tile included in the slice to the next tile may be used.

For example, the metadata updating unit may add or delete the slice-basis metadata in response to change of the slice configuration in the picture. As described above with reference to FIG. 3, a slice header is provided for each slice in the HEVC bitstream. Consequently, for example, the metadata updating unit adds a slice header for a new slice in a case where a slice configuration is changed and the new slice is provided, and deletes a slice header for a slice in a case where the slice is reduced. This operation enables the slice-basis metadata to match the slice configuration in the picture.

For example, the metadata updating unit may update the picture-basis metadata. As illustrated in B of FIG. 3, a picture parameter set is provided as metadata for each picture of the bitstream B. Updating such a picture parameter set (PPS) of each picture (PPS update) enables information contained in the picture parameter set to match coded data of the picture (slice data of each slice contained in the picture).

For example, the metadata updating unit may update information, regarding a tile set, contained in the picture-basis metadata in response to change of the tile configuration in the tile set, which is independently decodable, in the picture. This update enables information regarding the tile set to appropriately match the coded data of the picture, for example, to match changes of a tile configuration in the tile set and the like. Note that any information regarding the tile set is used. For example, identification information for identifying whether one tile constitutes the tile set or a plurality of tiles constitutes the tile set may be used.

For example, the metadata updating unit may update information, regarding a tile configuration in a tile set, contained in the picture-basis metadata in response to change of the tile configuration in the tile set, which is independently decodable, in the picture. This update enables information regarding the tile configuration in the tile set to appropriately match the coded data of the picture, for example, to match changes of a tile configuration in the tile set and the like. Note that any information regarding a tile configuration in the tile set is used. For example, information regarding the number of divisions (number of tiles) of a tile set in row and column directions may be used.

For example, the metadata updating unit may update upper metadata equal to or greater than a sequence level. As illustrated in B of FIG. 3, the bitstream B includes, for example, a sequence parameter set (SPS) and a video parameter set (VPS), which are upper metadata equal to or greater than the sequence level. Updating such upper metadata (VPS and SPS updates) enables information contained in the upper metadata to match coded data contained in the bitstream.

For example, the metadata updating unit may update information regarding an image frame contained in the upper metadata in accordance with the size of a partial area to be extracted. This update enables information regarding the image frame to appropriately match the size of each picture (size of a partial area to be extracted).

For example, the metadata updating unit may delete metadata regarding an independently decodable tile set. For example, in a case where management of a tile set is unnecessary in the bitstream B after extraction, for example, in a case where one tile set is extracted from the bitstream A in A of FIG. 3, metadata regarding the tile set is unnecessary. Consequently, the metadata updating unit deletes the metadata regarding the tile set, allowing reduction of an amount of unnecessary information of the bitstream.

Note that the image processing apparatus may further include a metadata extracting unit that extracts metadata from coded data of a moving image, and the metadata updating unit may update the metadata extracted by the metadata extracting unit. In that case, the metadata extracting unit may extract upper metadata equal to or greater than a sequence level. Furthermore, the metadata extracting unit may extract picture-basis metadata.

Furthermore, the image processing apparatus may further include a data extracting unit that extracts coded data of a partial area from coded data of a moving image, and the metadata updating unit may update the metadata contained in the coded data of the partial area extracted by the data extracting unit. In that case, the metadata updating unit may update slice-basis metadata contained in the coded data of the partial area.

2. First Embodiment

<Data Conversion Apparatus>

Figure 4:
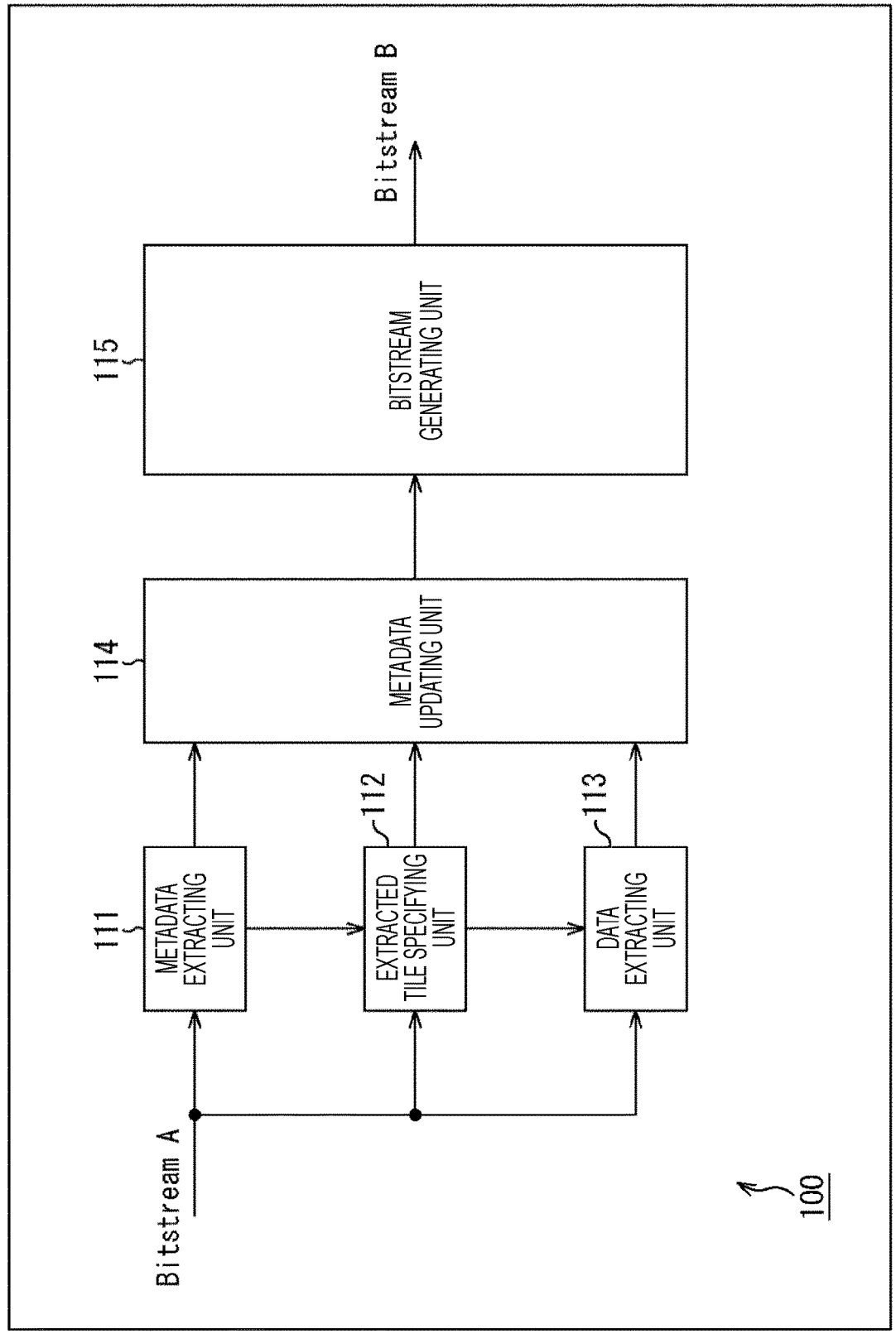
FIG. 4 is a block diagram illustrating a main configuration example of a data conversion apparatus.

FIG. 4 is a block diagram illustrating one example of the configuration of a data conversion apparatus that is one aspect of an image processing apparatus to which the present technology is applied. A data conversion apparatus 100 illustrated in FIG. 4 generates a bits ream B (Bitstream B) by extracting coded data of a partial area of a moving image from a bitstream A (Bitstream A), which is coded data of the moving image coded by HEVC.

As illustrated in FIG. 4, the data conversion apparatus 100 includes a metadata extracting unit 111, an extracted tile specifying unit 112, a data extracting unit 113, a metadata updating unit 114, and a bitstream generating unit 115.

The metadata extracting unit 111 performs processing regarding extraction of metadata. For example, the metadata extracting unit 111 acquires the bitstream A (Bitstream A), which is coded data of a moving image input to the data conversion apparatus 100. The metadata extracting unit 111 extracts, for example, upper metadata, such as a video parameter set and a sequence parameter set, or picture-basis metadata, such as a picture parameter set, from the bitstream A. The metadata extracting unit 111 supplies the metadata extracted from the bitstream A to the extracted tile specifying unit 112 and the metadata updating unit 114.

The extracted tile specifying unit 112 performs processing regarding specification of the tile (partial area) to be extracted. For example, the extracted tile specifying unit 112 acquires picture-basis metadata such as the picture parameter set supplied from the metadata extracting unit 111. The extracted tile specifying unit 112 grasps a tile configuration in a picture on the basis of the picture-basis metadata. The extracted tile specifying unit 112 specifies to which tile in the picture a range of the partial area to be extracted corresponds. The range has been specified by, for example, a user or a program, or set on the basis of any information. That is, the extracted tile specifying unit 112 specifies a tile to be extracted (i.e., partial area to be extracted) from a tile group in the picture.

Note that, in a case where an independently decodable tile set is set by the MCTS SEI in the bitstream A before extraction, the extracted tile specifying unit 112 may specify the partial area to be extracted on the basis of that tile set. That is, in this case, one or more tile sets constitute the specified partial area. In this way, defining the independently decodable tile set as a data basis of the partial area enables the partial area to be independently decodable. That is, the coded data of the partial area can be extracted more easily. The extracted tile specifying unit 112 supplies information indicating the specified tile (tile to be extracted) to the data extracting unit 113 and the metadata updating unit 114.

The data extracting unit 113 performs processing regarding extraction of coded data. For example, the data extracting unit 113 acquires the bitstream A (Bitstream A), which is coded data of a moving image input to the data conversion apparatus 100. Furthermore, the data extracting unit 113 acquires information, indicating a tile to be extracted, supplied from the extracted tile specifying unit 112. The data extracting unit 113 extracts, for example, coded data of the tile specified by the extracted tile specifying unit 112 from the bitstream A. The data extracting unit 113 supplies the coded data of the extracted partial area to the metadata updating unit 114.

The metadata updating unit 114 performs processing regarding update of metadata. For example, the metadata updating unit 114 acquires the metadata, extracted from the bitstream A, supplied from the metadata extracting unit 111. Furthermore, the metadata updating unit 114 acquires the information, indicating a tile to be extracted, supplied from the extracted tile specifying unit 112. Furthermore, the metadata updating unit 114 acquires the coded data of the extracted partial area, supplied from the data extracting unit 113. The metadata updating unit 114 updates the extracted metadata and metadata contained in the coded data of the extracted partial area, as necessary, on the basis of the information indicating a tile to be extracted. For example, the metadata updating unit 114 can update metadata at all levels, such as upper metadata, picture-basis metadata, and slice-basis metadata. The metadata updating unit 114 supplies the metadata and the coded data which are updated as necessary to the bitstream generating unit 115.

The bitstream generating unit 115 performs processing regarding generation of the bitstream of the partial area. For example, the bitstream generating unit 115 acquires the metadata and the coded data supplied from the metadata updating unit 114. The bitstream generating unit 115 generates a bitstream containing the metadata and the coded data, that is, a bitstream of the extracted partial area. The bitstream generating unit 115 outputs the generated bitstream (bitstream (Bitstream B)) to the outside of the data conversion apparatus 100.

In this way, the metadata updating unit 114 updates the metadata extracted from the coded data of the moving image in accordance with the coded data of the partial area of the moving image extracted from the coded data of the moving image, so that the data conversion apparatus 100 enables the metadata to appropriately match the coded data of the partial area after extraction. That is, decoding as a bitstream having an image of the partial area serving as a frame image, is possible, and thus the processing capacity (profile level) required for decoding can be reduced. Moreover, decoding can be made possible without requiring processing such as grasping or correcting of mismatch between the metadata and the coded data. That is, increase of a load of decoding can be inhibited.

<Flow of Conversion Processing>

The data conversion apparatus 100 extracts the partial area as described above by executing data conversion processing. An example of the flow of the data conversion processing will be described with reference to flowchart of FIG. 5.

When the data conversion processing is started, the metadata extracting unit 111 of the data conversion apparatus 100 extracts the upper metadata from the input bitstream A in step S101. The upper metadata is metadata at a sequence level or a level higher than the sequence level, for example, the video parameter set, the sequence parameter set, and the like. In step S102, the metadata extracting unit 111 initializes a variable $N_{POC}$ (e.g., sets $N_{POC}$=0) indicating a frame number of a picture to be processed.

In step S103, the metadata extracting unit 111 extracts, from the bitstream A, picture-basis metadata (e.g., picture parameter set) of the picture to be processed, that is, the picture with the frame number $N_{POC}$. In step S104, the extracted tile specifying unit 112 grasps a tile configuration in the picture on the basis of the picture-basis metadata extracted in step S103. The extracted tile specifying unit 112 specifies to which tile (tile set) in the picture a range of the partial area to be extracted corresponds. The range has been specified by, for example, a user or a program, or set on the basis of any information. That is, the extracted tile specifying unit 112 specifies a tile to be extracted from a tile group in the picture. The MCTS SEI is set for the bitstream A. Each tile set of the bitstream A is independently decodable. Consequently, the extracted tile specifying unit 112 specifies a partial area to be extracted defining the tile set as a minimum basis. In step S105, the data extracting unit 113 extracts, from the bitstream A, the coded data of the tile set of the picture to be processed. The tile set has been specified in step S104.

In step S106, the metadata updating unit 114 updates slice-basis metadata (e.g., slice header and the like) contained in the coded data of the tile set of the picture to be processed. The coded data has been extracted in step S105. Details of this processing will be described later. In step S107, the metadata updating unit 114 updates the picture-basis metadata of the picture to be processed.

In step S108, the metadata extracting unit 111 determines whether or not all the pictures have been processed. In a case where it is determined that an unprocessed picture exists, the processing proceeds to step S109. In step S109, the metadata extracting unit 111 increments (e.g., +1) the variable $N_{POC}$. That is, the object to be processed is shifted to the next picture. When the processing in step S109 is finished, the processing returns to step S103, and the subsequent pieces of processing are executed. The processing in steps S103 to S109 is repeated as described above. In a case where it is determined in step S108 that all the pictures have been processed, the processing proceeds to step S110.

In step S110, the metadata updating unit 114 updates the upper metadata (e.g., video parameter set, sequence parameter set, and the like) extracted in step S101. In step S111, the bitstream generating unit 115 generates a bitstream of the extracted partial area. The bitstream contains the metadata processed as described above and a coded stream.

When the processing in step S111 is finished, the conversion processing is finished. Executing the conversion processing as described above enables the metadata to appropriately match the coded data of the partial area after extraction, so that the increase of a load of decoding can be inhibited.

<Upper Metadata Update>

Figure 6:
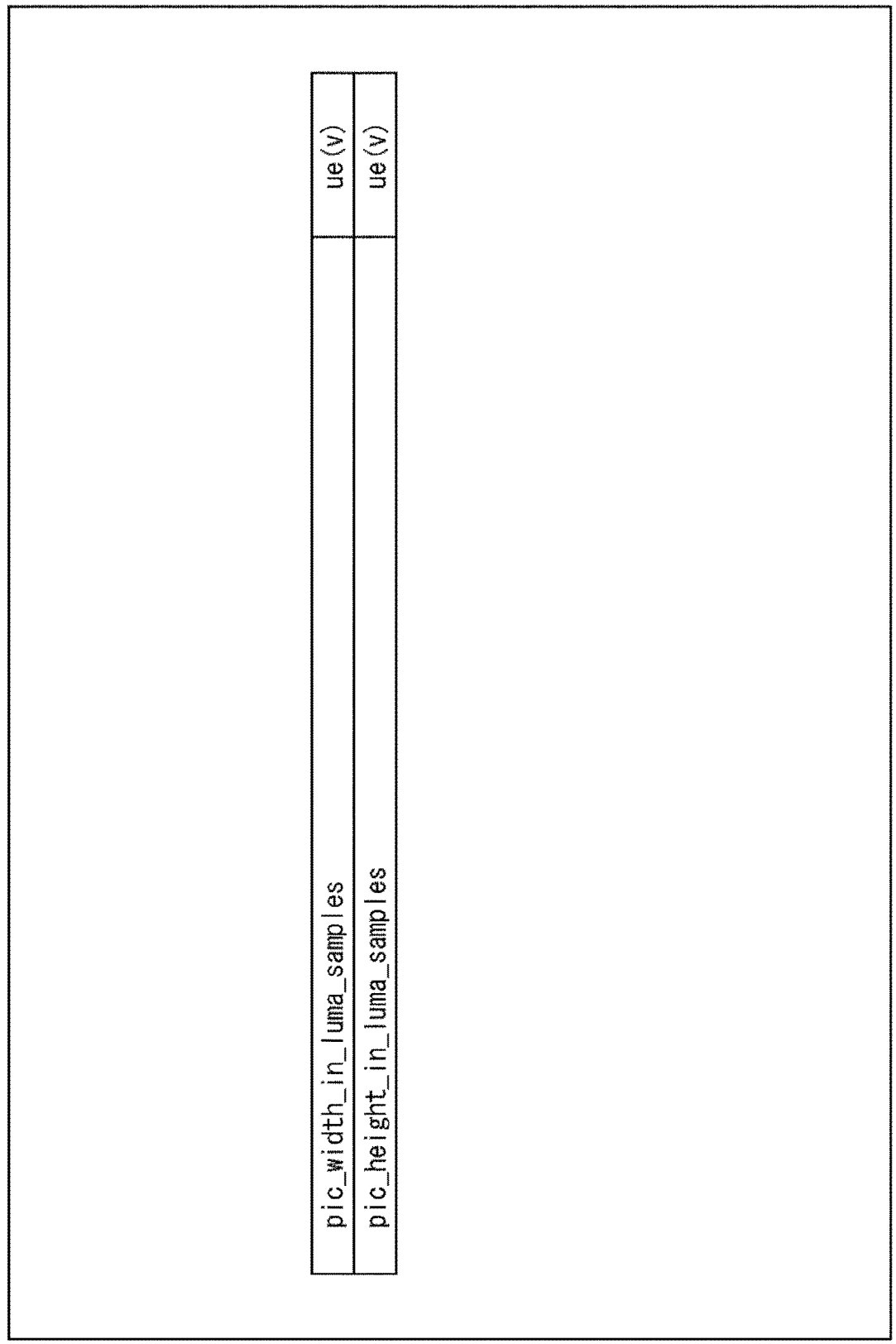
FIG. 6 illustrates an example of a syntax updated by a sequence parameter set.

Note that, as described above, the metadata updating unit 114 updates the upper metadata in step S110. This update enables information contained in the upper metadata to appropriately match the coded data of the partial area to be extracted. For example, the metadata updating unit 114 updates information regarding an image frame contained in the sequence parameter set. FIG. 6 illustrates an example of a part of a syntax of the sequence parameter set. The pic_width_in_luma_samples illustrated in FIG. 6 is a parameter indicating the size of a picture in a horizontal direction. Furthermore, the pic_height_in_luma_samples is a parameter indicating the size of the picture in a vertical direction.

In the bitstream (bitstream B) after extraction, the size of the partial area to be extracted corresponds to the picture size (image frame). The metadata updating unit 114 thus updates the values of these parameters so that the values match the size of the partial area to be extracted. This update enables information regarding the image frame contained in the sequence parameter set to appropriately match the size of the partial area to be extracted. Consequently, the profile level can be appropriately reduced, and the increase of a load of decoding can be inhibited.

Furthermore, in a case where management of the independently decodable partial area (tile set) is unnecessary in the coded data after extraction, for example, in a case where one tile set constitutes the extracted partial area, the metadata updating unit 114 deletes the MCTS SEI, which is metadata regarding the tile set. Alternatively, the metadata extracting unit 111 may be formed such that the metadata extracting unit 111 does not extract the MCTS SEI. This configuration enables reduction of unnecessary information amount of the bitstream after extraction.

<Picture-Basis Metadata Update>

Furthermore, as described above, the metadata updating unit 114 updates the picture-basis metadata in step S107. This update enables information contained in the picture-basis metadata to appropriately match the coded data of the partial area to be extracted. For example, the metadata updating unit 114 updates information regarding the tile set contained in the picture parameter set and information regarding the tile configuration in the tile set.

FIG. 7 illustrates an example of a part of a syntax of the picture parameter set. The tiles_enabled_flag illustrated in FIG. 7 is identification information for identifying whether one tile constitutes a tile set or a plurality of tiles constitutes the tile set. That is, this parameter is information regarding the tile set. Furthermore, the num_tile_columns_minus1 illustrated in FIG. 7 is a parameter indicating the number of divisions (number of tiles) in a column direction of the tile set. The num_tile_rows_minus1 is a parameter indicating the number of divisions (number of ties) in a row direction of the tile set. That is, these parameters are information regarding the tile configuration in the tile set.

Since any tile set in the bitstream (bitstream B) after extraction can be set, the tile configuration in the tile set may be different from the bitstream (bitstream A) before extraction. Consequently, the metadata updating unit 114 updates the values of these parameters so that the values match the tile configuration in the tile set after extraction.

More specifically, in a case where the tile set includes a plurality of tiles in the bitstream (bitstream B) after extraction, the value of the tiles_enabled_flag is set to 1, and the values of the num_tile_columns_minus1 and the num_tile_rows_minus1 are set in accordance with the tile configuration (number of divisions) in the tile set. Furthermore, in a case where the tile set includes one tile, the value of the tiles_enabled_flag is set to 0.

This setting enables the information regarding the tile set or the information regarding the tile configuration in the tile set to appropriately match the tile configuration in the tile set of the partial area to be extracted. Consequently, decoding is made possible without requiring processing such as grasping and correcting of mismatch between the metadata and the coded data, and the increase of a load of decoding can be inhibited.

Note that, although the tiles_enabled_flag is exemplified as the information regarding the tile set in the above description, any information regarding the tile set is used, and other parameters may be contained. Furthermore, although, in the above description, the num_tile_columns_minus1 and the num_tile_rows_minus1 are exemplified as the information regarding the tile configuration in the tile set, any content of information regarding the tile configuration in the tile set is used, and other parameters may be contained.

<Flow of Metadata Update Processing>

Figure 5:
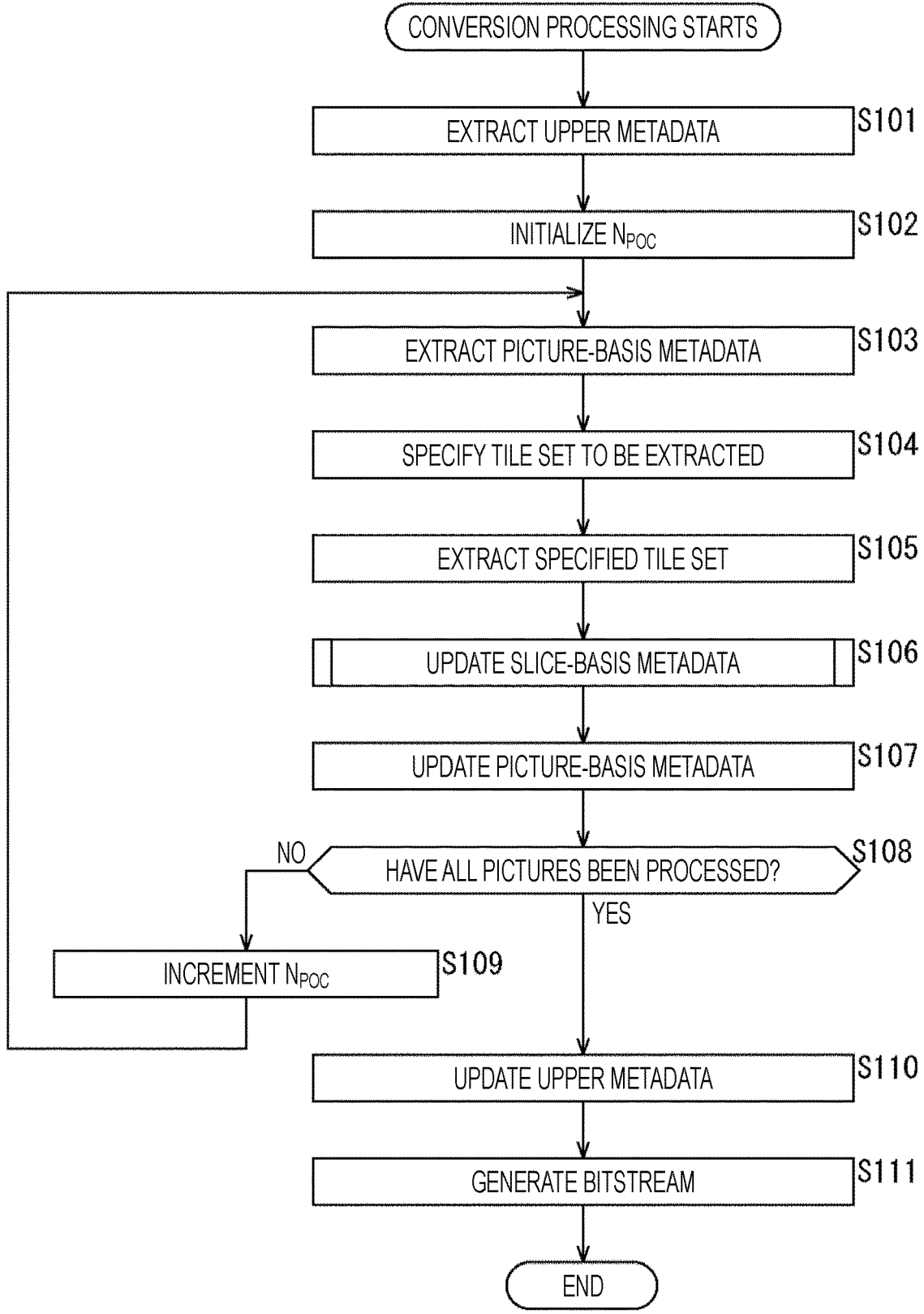
FIG. 5 is a flowchart illustrating an example of a flow of conversion processing.
Figure 8:
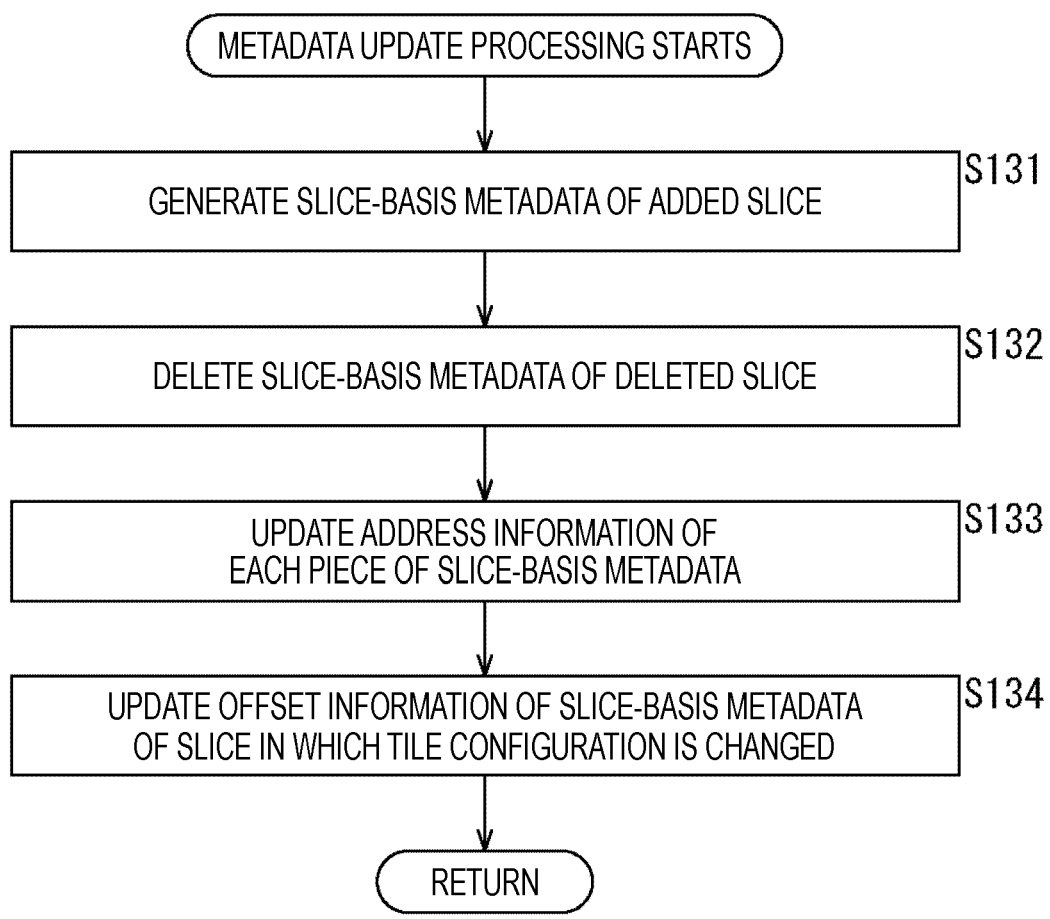
FIG. 8 is a flowchart illustrating an example of a flow of metadata update processing.

Next, an example of the flow of metadata update processing executed in step S106 in FIG. 5 will be described with reference to the flowchart of FIG. 8.

When the metadata updating processing is started, the metadata updating unit 114 generates slice-basis metadata of an added slice in step S131. For example, in a case where a new slice is set in the bitstream B after extraction, such as a case where a plurality of tiles put together in one slice in the bitstream A before the extraction is divided into a plurality of slices, the metadata updating unit 114 generates slice-basis metadata for the slice.

In step S132, the metadata updating unit 114 deletes the slice-basis metadata of the deleted slice. For example, in a case where a slice is deleted in the bitstream B after extraction, such as a case where a plurality of tiles belonging to different in the bitstream A before the extraction is put into one slice, the metadata updating unit 114 deletes the slice-basis metadata for the slice to be deleted.

That is, the metadata updating unit 114 causes the number of the slice-basis metadata to match the number of slices in the bitstream B after the extraction, in these pieces of processing.

In step S133, the metadata updating unit 114 updates address information contained in each piece of slice-basis metadata. A picture before extraction and a picture including a partial area after the extraction differ in the slice configuration and the tile configuration. For that reason, the metadata updating unit 114 updates the address information contained in each piece of slice-basis metadata so as to deal with the changes.

In step S134, the metadata updating unit 114 updates offset information of the slice-basis metadata of a slice in which the tile configuration is changed. In a case where the slice-basis metadata contains offset information indicating head positions of each tile, the metadata updating unit 114 updates the offset information so as to deal with the change in the tile configuration in the slice.

When the processing in step S134 is finished, the metadata update processing is finished. Executing the metadata update processing as described above enables the slice-basis metadata to appropriately match the coded data of the partial area after extraction, so that the increase of a load of decoding can be inhibited.

<Update of Address Information>

FIG. 9 illustrates an example of a syntax of a part of a slice header. A of FIG. 9 illustrates an example of a syntax of a part of a slice header. In B of FIG. 9, FIG. 9 illustrates an example of a syntax of another part of the slice header. The slice_segment_address illustrated in A of FIG. 9 is a parameter indicating the position of a head block (coding tree unit (CTU)) of a slice. The slice_segment_address indicates the position of the head block in a scan order (i.e., the number of blocks (CTU address) from the first processed block in the picture to the head block of the slice) of the block in the picture. That is, this parameter is information regarding the address.

As described above, the metadata updating unit 114 updates address information in accordance with the slice configuration and the tile configuration in the coded data after extraction in step S133. For example, as illustrated in A of FIG. 10, it is assumed that tile data 202 and tile data 203 are extracted from a picture including four pieces of tile data Data) of tile data 201 to tile data 204. Note that, any slice configuration is used in the state before the extraction in A of FIG. 10. Furthermore, it is assumed that A corresponds to a CTU address (CTU actress) of a head block (CTU) of the tile data 202, and B corresponds to a CTU address of a head block (CTU) of the tile data 203.

Figure 10:
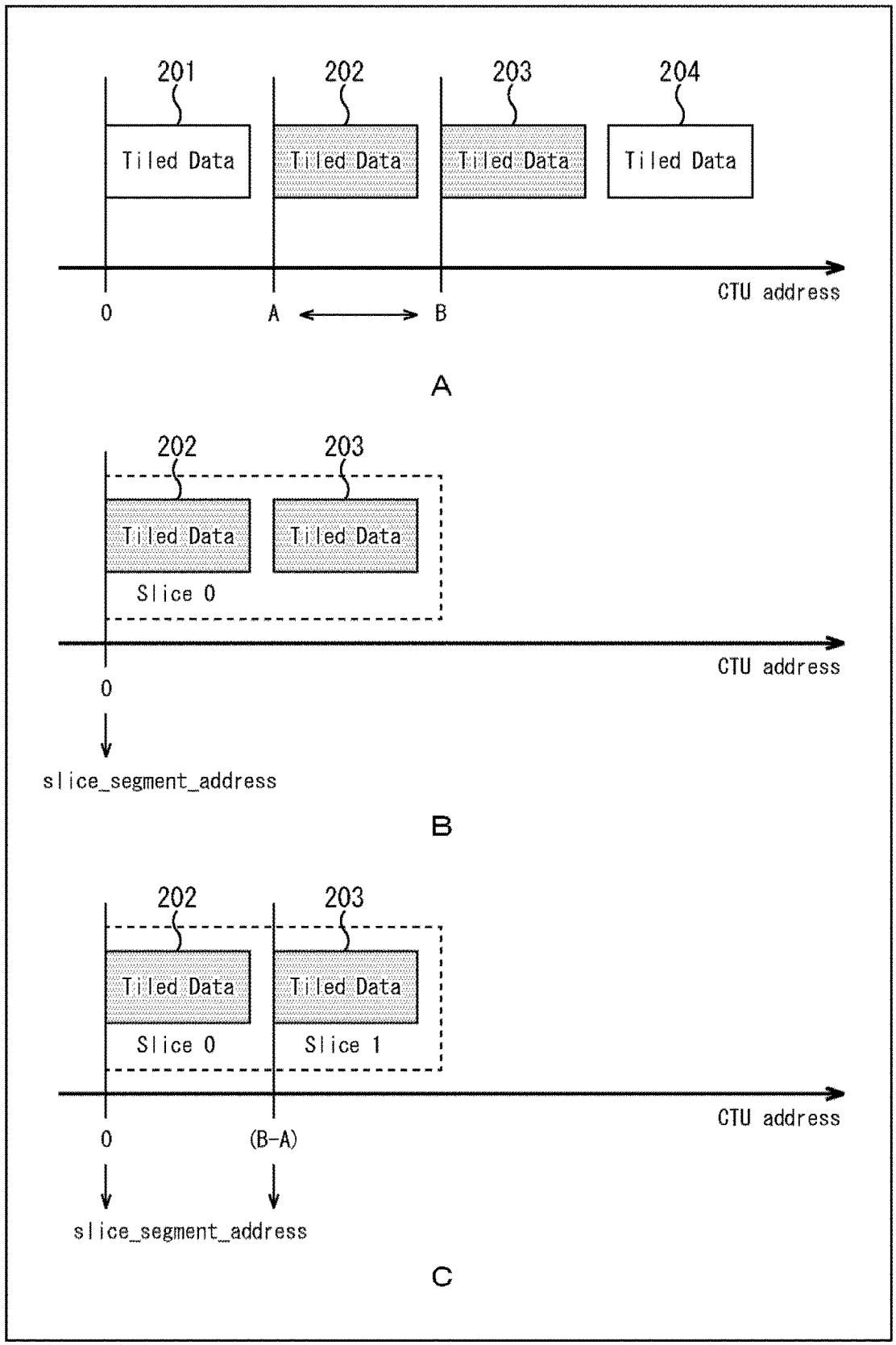
FIG. 10 illustrates a pattern example of the tile-set extraction.

In this case, as in the example of B of FIG. 10, in a case where the tile data 202 and tile data 203 are put into one slice, the slice (slice 0) is the head slice in the picture. The metadata updating unit 114 sets the value of the slice_segment_address of the slice header to "0".

Furthermore, as in the example of C of FIG. 10, in a case where the tile data 202 and the tile data 203 are different slices, a slice (slice 0) of the tile data 202 is the head slice in the picture, and a slice (slice 1) of the tile data 203 is the next slice. Consequently, the metadata updating unit 114 sets the value of the slice_segment_address of the slice header of the slice (slice 0) of the tile data 202 to "0" and sets the value of the slice_segment_address of the slice header of the slice (slice 1) of the tile data 203 to "B-A".

This setting enables information, regarding an address, contained in the slice-basis metadata to appropriately match the slice configuration in a bitstream after extraction or the tile configuration in the slice. Consequently, decoding is made possible without requiring processing such as grasping and correcting of mismatch between the metadata and the coded data, and the increase of a load of decoding can be inhibited.

Note that, although the slice_segment_address is exemplified as the information regarding an address in the above description, any content of information regarding an address is used, and other parameters may be contained.

<Update of Offset Information>

The entry_point_offset_minus1 illustrated in B of FIG. 9 is a parameter indicating an offset to the position of the next slice. The entry_point_offset_minus1 indicates the length of the slice by byte align (Byte align). That is, this parameter is information regarding the offset.

As described above, the metadata updating unit 114 updates the offset information in accordance with the tile configuration in a slice in the coded data after extraction in step S134. For example, as illustrated in A of FIG. 11, it is assumed that tile data 202 and tile data 203 are extracted from a picture including four pieces of tile data (Tile Data) of tile data 201 to tile data 204. Note that, any slice configuration is used in the state before the extraction in A of FIG. 11. Furthermore, it is assumed that A corresponds to a head data address (DATA address) of the tile data 202, and B corresponds to a head data address of the tile data 203.

Figure 11:
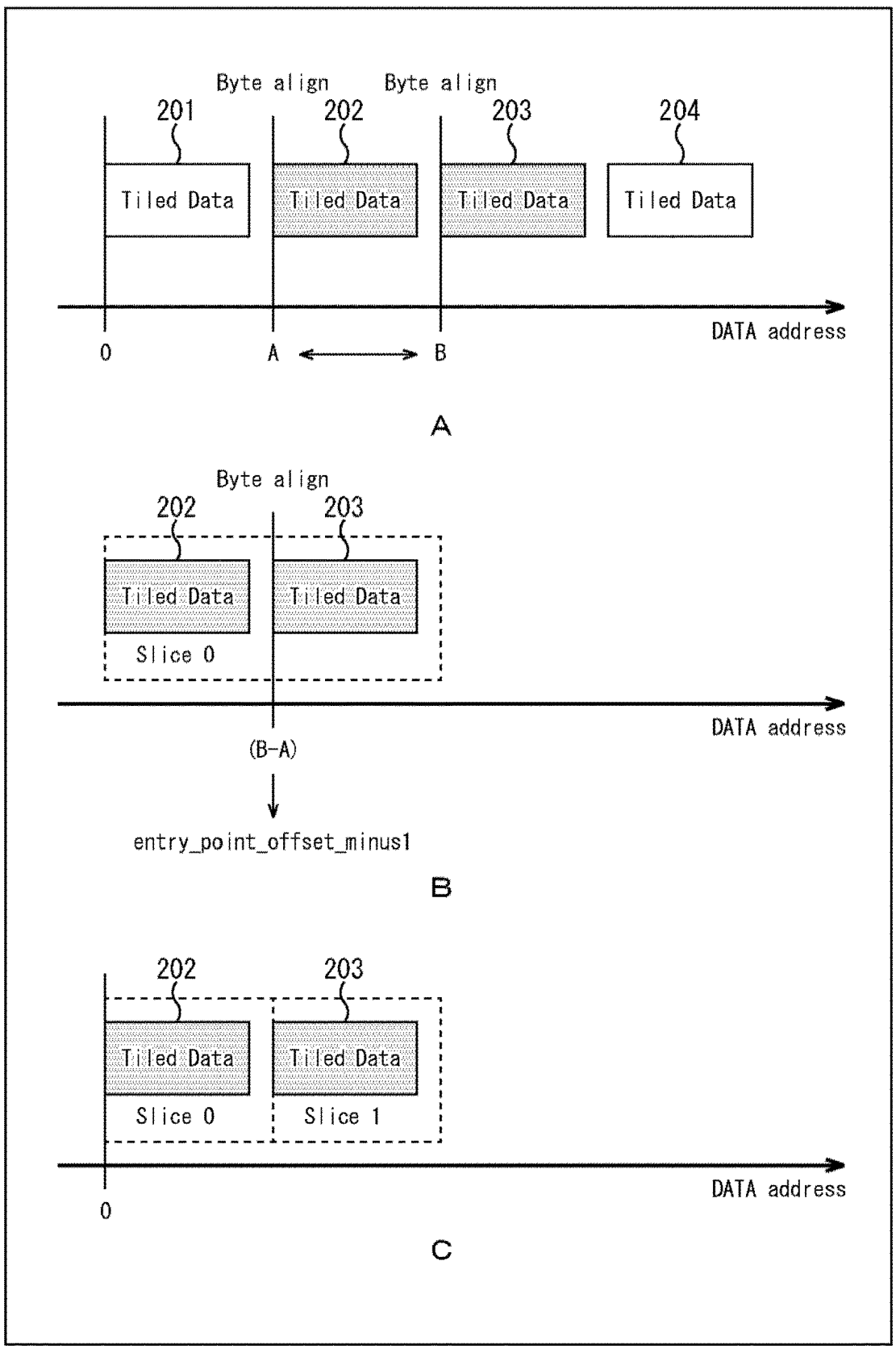
FIG. 11 illustrates a pattern example of the tile-set extraction.

In this case, as in the example of B of FIG. 11, in a case where the tile data 202 and tile data 203 are put into one slice, the slice header of the slice (slice 0) needs offset information for the tile data 203. Then, the metadata updating unit 114 sets the value of the entry_point_offset_minus1, corresponding to the tile data 202, of the slice header to "B-A".

Furthermore, as in the example of C of FIG. 11, in a case where the tile data 202 and the tile data 203 are different slices, each slice contains one piece of tile data, and thus each slice header does not need the offset information. Then, the metadata updating unit 114 does not set the entry_point_offset_minus1.

This enables information regarding an offset contained in the slice-basis metadata to appropriately match the slice configuration in a bitstream after extraction or the tile configuration in the slice. Consequently, decoding is made possible without requiring processing such as grasping and correction of mismatch between the metadata and the coded data, and the increase of a load of decoding can be inhibited.

Note that, although, in the above description, the entry_point_offset_minus1 is exemplified as the information regarding an offset, any content of information regarding an offset is used, and other parameters may be contained.

<Addition and Deletion of Slice-Basis Metadata>

As illustrated in FIGS. 10 and 11, the metadata updating unit 114 sets a slice header in accordance with the slice configuration after extraction. That is, in a case where an existing slice is deleted, the slice header is also deleted. In a case where a new slice is set, the slice header is created. This operation enables the slice-basis metadata to match the slice configuration in the picture. Consequently, decoding is made possible without requiring processing such as grasping and correcting of mismatch between the metadata and the coded data, and the increase of a load of decoding can be inhibited.

<Use Case 1>

Figure 12:
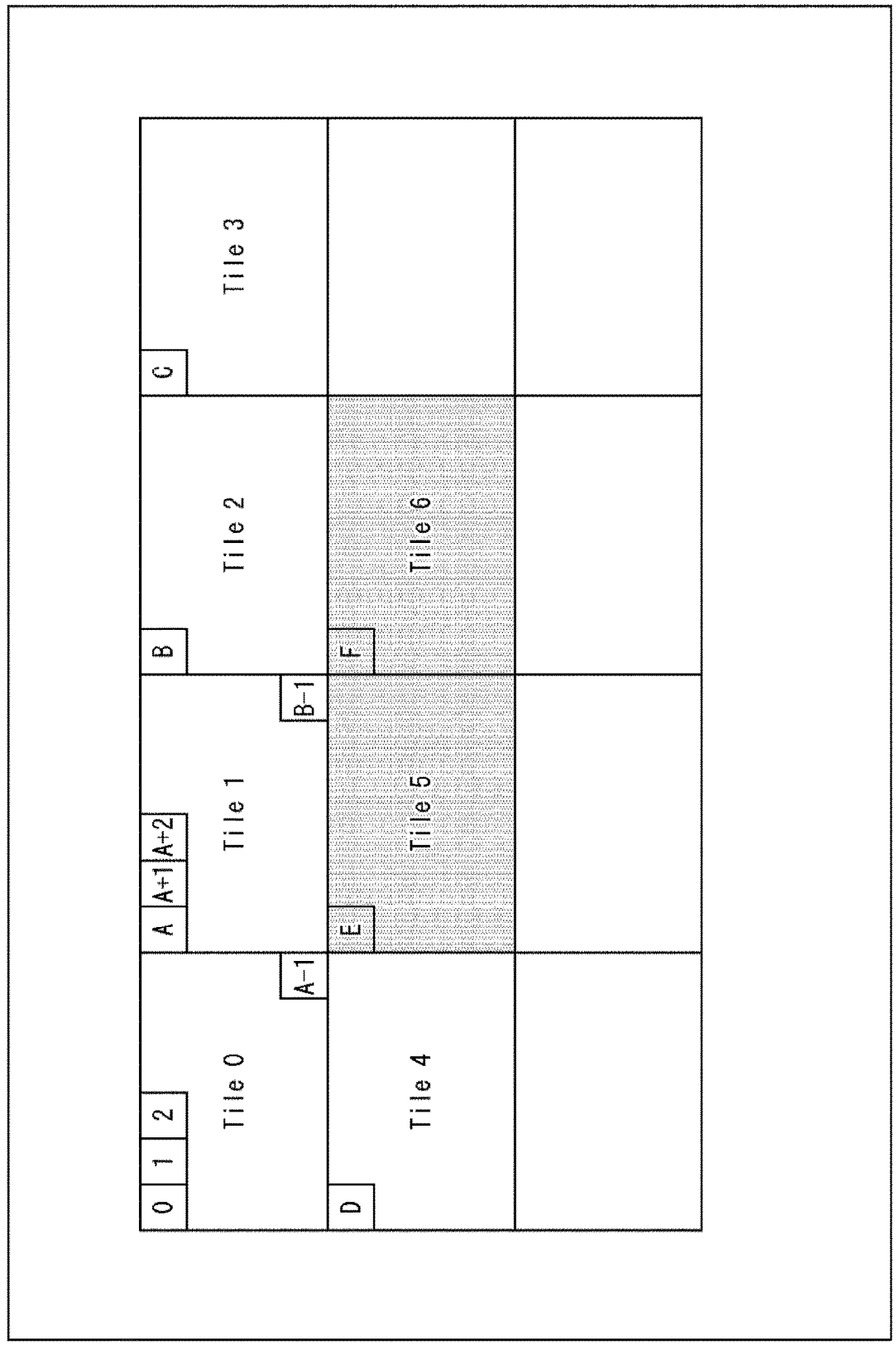
FIG. 12 illustrates an example of a tile configuration of a picture.

A more specific example will be described. For example, it is assumed that a tile configuration in a picture of coded data of a moving image has a configuration as illustrated in FIG. 12. In FIG. 12, the entire quadrangle indicates a picture, the next bigger 4×3 quadrangle indicates a tile, and the smallest quadrangle indicates a CTU. "Tile N" in each tile indicates a tile number N of the tile. Furthermore, a number, an alphabet, and an expression in each CTU indicate the CTU address of the CTU. For example, the head CTU (upper left CTU) of a tile 0 (Tile 0) has a CTU address of "0", and the last CTU (lower right CTU) has a CTU address of "A−1". Furthermore, the head CTU of a tile 1 (Tile 1) has a CTU address of "A", and the last CTU has a CTU address of "B−1". The head CTU of a tile 2 (Tile 2) has a CTU address of "B". In addition, the head CTU of a tile 5 (Tile 5) has a CTU address of "E". The head CTU of a tile 6 (Tile 6) has a CTU address of "E". It is assumed that the tiles 5 and 6 are extracted from such a picture.

For example, as illustrated in A of FIG. 13, it is assumed that the tiles 5 and 6 belong to different slices (Slices X and (X+1) in the state before extraction. The tiles 5 and 6 are extracted. After the extraction, the tile 5 is managed as a tile 0 (Tile 0), and the tile 6 is managed as a tile 1 (Tile 1).

Then, it is assumed that, after the extraction, these tiles are put into one slice (Slice 0) as illustrated in B of FIG. 13. In that case, as illustrated in B of FIG. 13, in the slice header of the slice 0 (Slice 0), the CTU address of the head CTU of the tile 0 is set to "0", and the offset for the tile 1 is set to the byte size of the tile 0.

An example of updating a parameter in that case is illustrated in A of FIG. 14. The first_slice_segment_in_pic_flag is flag information indicating whether or not the slice is the head slice of the picture. The slice 0 is the head slice, and thus this value is set to "1". Then, the slice 0 is the head slice, and thus the CTU address of head CTU is "0". Consequently, the slice_segment_address is set to "0". The num_entry_point_offsets is a parameter indicating the number of number (entry_point_offset_minus1) of offsets to be set. As illustrated in B of FIG. 13, the two tiles constitute the slice 0, and the value is set to "1". Then, the value of the offset_len_minus1 is set to a value corresponding to the byte size of the tile 0, and the value of the entry_point_offset_minus1 [0] is set to the byte size of the tile 0. That is, also parameters such as the num_entry_point_offsets and the offset_len_minus1 can be said to be included in the information regarding the offset.

Note that, although, in the above description, the number of tiles of the slice 0 is described as 2, in a case where the slice 0 includes N tiles, the parameter of the slice header is updated as in the example illustrated in B of FIG. 14.

Also in this case, as in the case of A of FIG. 14, the first_slice_segment_in_pic_flag is set to "1", and the slice_segment_address is set to "0". The num_entry_point_offsets, however, is set to "N−1". Then, the offset_len_minus1 is set to a value corresponding to the byte size of the tiles 0 to (N−1), and each of the entry_point_offset_minus1 [0] to the entry_point_offset_minus1 [N−2] is set to the byte size of the tiles 0 to (N−2).

<Use Case 2>

Furthermore, for example, as illustrated in A of FIG. 15, it is assumed that the tiles 5 and 6 in FIG. 12 belong to different slices (Slices X and (X+1)) in the state before extraction. The tiles 3 and 6 are extracted. After the extraction, the tile 5 is managed as a tile 0 (Tile 0), and the tile 6 is managed as a tile 1 (Tile 1).

Then, as illustrated in B of FIG. 15, it is assumed that the slice configuration is maintained even after the extraction. That is, it is assumed that the tiles 0 and 1 belong to different slices (Slices 0 and 1). In that case, as illustrated in B of FIG. 15, the CTU address of the head CTU of the tile 0 is set to "0" in the slice header of the slice 0 (Slice 0), and the CTU address of the head CTU of the tile 1 is set to "F−E" in the slice header of the slice 1 (Slice 1). Note that, in this case, one tile constitutes each slice, and thus these slice headers do not need information regarding the offset.

Figure 16:
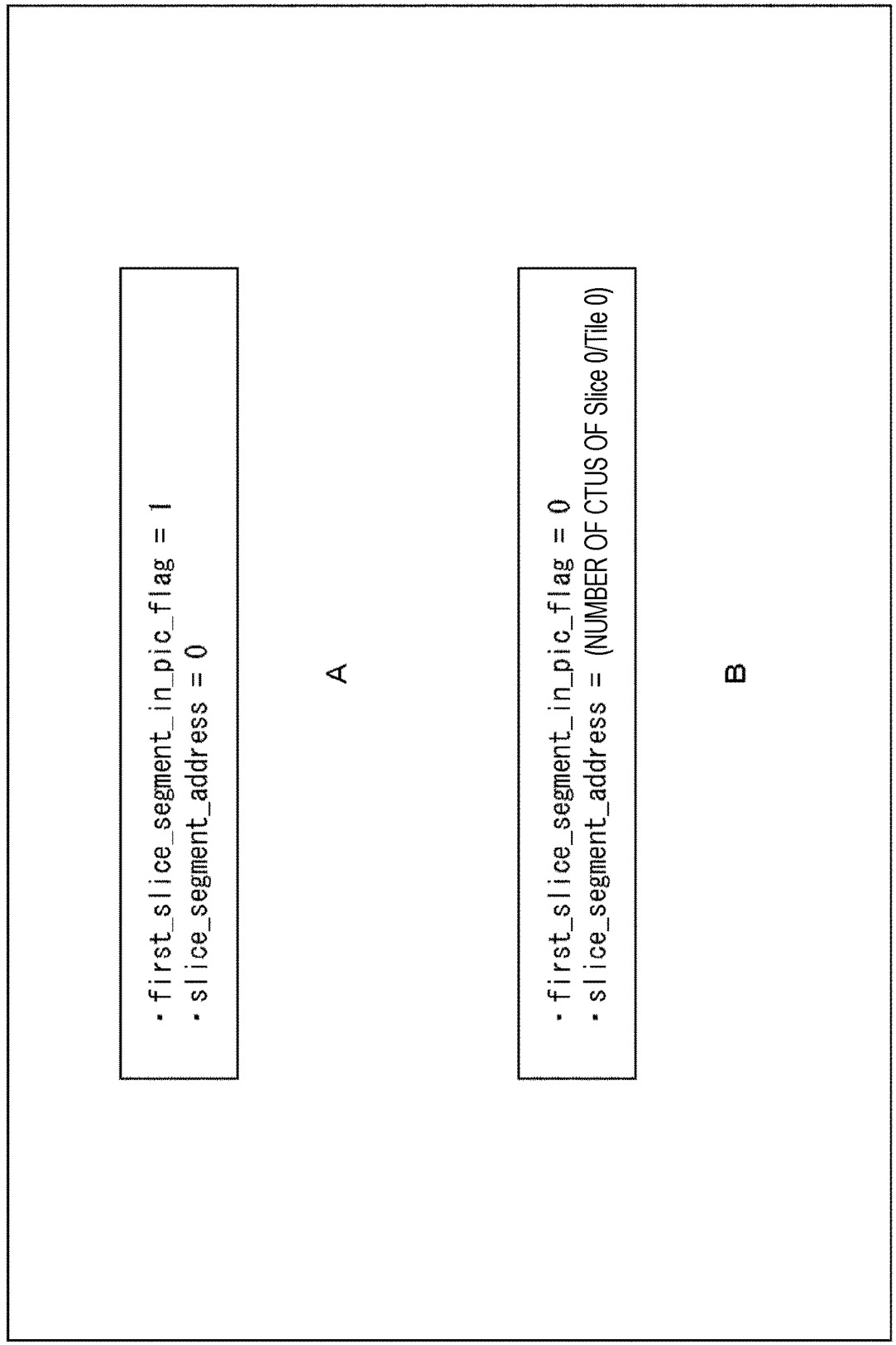
FIG. 16 illustrates an example of parameters to be updated.

In this case, for example, the first_slice_segment_in_pic_flag is set to "1", and the slice_segment_address is set to "0" in the slice header of the slice 0, as illustrated in A of FIG. 16. Furthermore, the first_slice_segment_in_pic_flag is set to "0", and the slice_segment_address is set to "the number of CTUs (e.g., F−E) of the tile 0 of the slice 0" in the slice header of the slice 1, as illustrated in B of FIG. 16.

<Use Case 3>

Furthermore, for example, as illustrated in A of FIG. 17, it is assumed that the tiles 5 and 6 in FIG. 12 belong to a common slice (Slice X) in the state before extraction. The tiles 5 and 6 are extracted. After the extraction, the tile 5 is managed as a tile 0 (Tile 0), and the tile 6 is managed as a tile 1 (Tile 1).

Then, as illustrated in B of FIG. 17, it is assumed that the slice configuration is maintained even after the extraction. That is, it is assumed that the tiles 0 and 1 belong to a common slice (Slice 0). In that case, as illustrated in B of FIG. 17, in the slice header of the slice 0 (Slice 0), the CTU address of the head CTU of the tile 0 is set to "0", and the offset for the tile 1 is set to the byte size of the tile 0. Since an example of updating a parameter in this case is similar to the example in A of FIG. 14, the description thereof will be omitted.

In contrast, as illustrated in C of FIG. 17, the slice is divided after the extraction. That is, it is assumed that the tales 0 and 1 belong to different slices (Slices 0 and 1). In that case, as illustrated in C of FIG. 17, the CTU address of the head CTU of the tile 0 is set to "0" in the slice header of the slice 0 (Slice 0), and the CTU address of the head CTU of the tile 1 is set to "F−E" in the slice header of the slice 1 (Slice 1). Note that, in this case, one tile constitutes each slice, and thus these slice headers do not need information regarding the offset. Since an example of updating a parameter in this case is similar to the example in FIG. 16, the description thereof will be omitted.

<Use Case 4>

Furthermore, for example, it is assumed that the slice is divided in the middle of the tile 5, the tile 5 belongs to slices X and (X+1), and the tile 6 belongs to another slice (X+2), in the state before the extraction, as illustrated in A of FIG. 18. The tiles 5 and 6 are extracted. After the extraction, the tile 5 is managed as a tile 0 (Tile 0), and the tile 6 is managed as a tile 1 (Tile 1).

Then, it is assumed that, after the extraction, the tile 0 is put into one slice (Slice 0) as illustrated the B of FIG. 18. In that case, as illustrated in B of FIG. 18, in the slice header of the slice 0 (Slice 0), the CTU address of the head CTU of the tile 0 is set to "0", and further the byte size of the slice X is set as the offset for the original slice (X+1).

An example of updating a parameter in this case is illustrated in A of FIG. 19. The first_slice_segment_in_pic_flag is set to "1", the slice_segment_address is set to "0", and the num_entry_point_offsets is set to "1". Then, the value of the offset_len_minus1 is set to a value corresponding to the byte size of the slices X and (X+1), and the value of the entry_point_offset_minus1 [0] is set to the byte size of the slice X.

Note that the slice 0 including the tile 0 can include another tile. For example, as illustrated in C of FIG. 18, the slice 0 can include the tile 1. In that case, as illustrated in C of FIG. 18, the byte size of the slice (X+1) is further set as the offset for the original slice (X+2).

An example of updating a parameter in a case where the slice 0 includes N tiles is illustrated in B of FIG. 19. Also in this case, the first_slice_segment_in_pic_flag is set to "1", and the slice_segment_address is set to "0". The num_entry_point_offsets, however, is set to "N−1 (number of the original slices)". Then, the offset_len_minus1 is set to a value corresponding to the byte size (byte size of the slice K to the slice (X+N−1)) of each original slice, and the entry_point_offset_minus1, whose number corresponds to the number of original slices (i.e., the entry_point_offset_minus1 [0] to the entry_point_offset_minus1 [N−2]), is set to each of the byte sizes of the slice X to the slice (X+N−2).

<Use Case 5>

Furthermore, for example, it is assumed that the state before extraction is similar to the state in A of FIG. 18 as illustrated in A of FIG. 20, and the slice configuration is maintained even after the extraction as illustrated in B of FIG. 20. That is, it is assumed that the slice is divided in the middle of the tile 0, the tile 0 belongs to the slices 0 and 1, and the tile 1 belongs to a slice 2.

In that case, as illustrated in B of FIG. 20, the CTU address of the head CTU of the tile 0 is set to "0" in the slice header of the slice 0 (Slice 0), and the CTU address of the head CTU of the slice 1 is set to "E'−E" in the slice header of the slice 1 (Slice 1). Furthermore, the CTU address of the head CTU of the tile 1 is set to "F−E'" in the slice header of the slice 2 (Slice 2). Note that, in this case, these slice headers do not need information regarding the offset.

Figure 21:
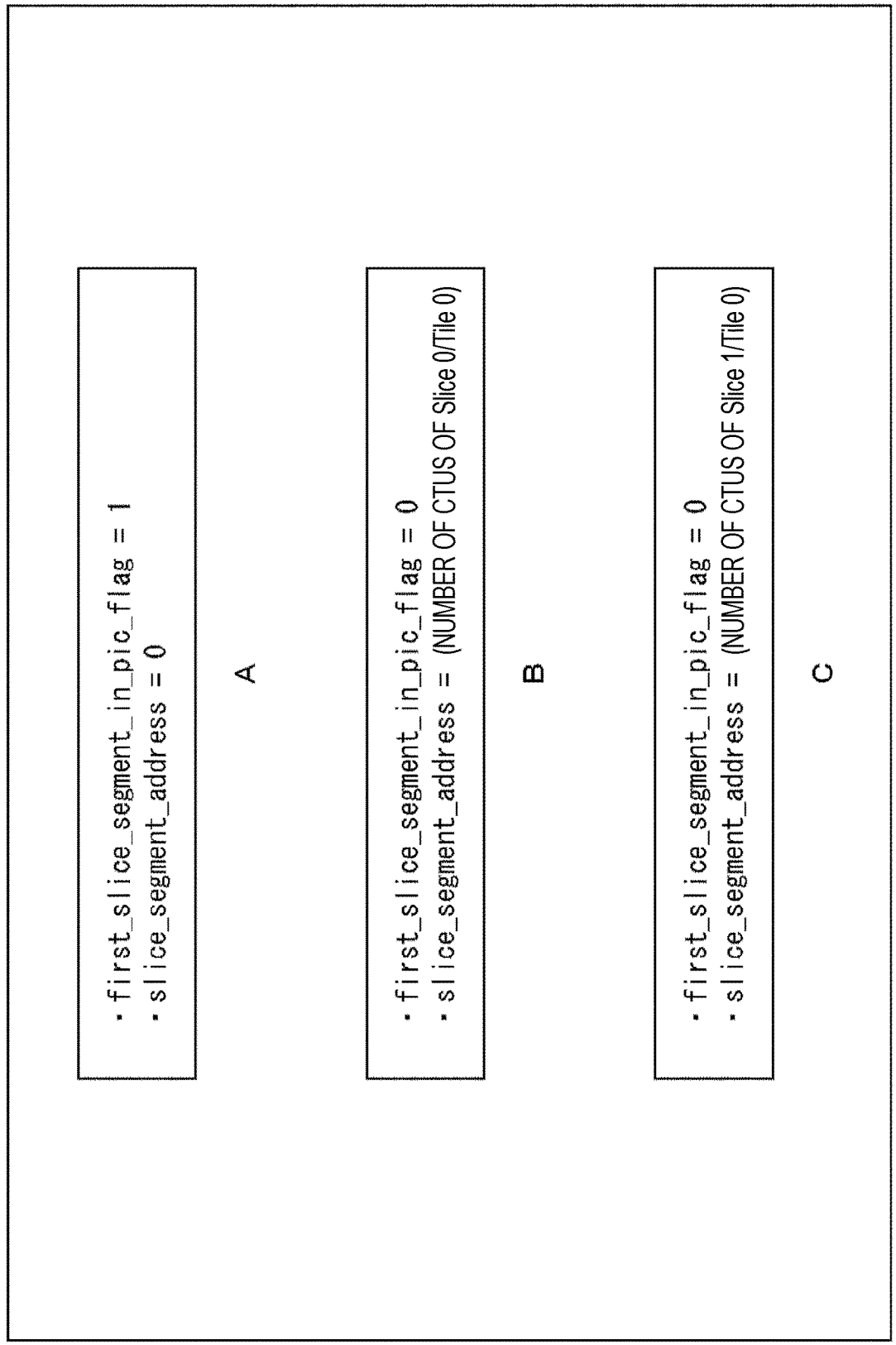
FIG. 21 illustrates an example of parameters to be updated.

In this case, for example, the first_slice_segment_in_pic_flag is set to "1", and the slice_segment_address is set to "0" in the slice header of the slice 0, as illustrated in A of FIG. 21. Furthermore, the first_slice_segment_in_pic_flag is set to "0", and the slice_segment_address is set to "number of CTUs (e.g., E'−E) of the original slice X" in the slice header of the slice 1, as illustrated in B of FIG. 21. Furthermore, the first_slice_segment_in_pic_flag is set to "0", and the slice_segment_address is set to "number of CTUs (e.g., F−E') of the original slice (X+1)" in the slice header of the slice 2, as illustrated in C of FIG. 21.

As described above, the metadata updating unit 114 can update metadata information in accordance with coded data of a partial area after extraction in any case. Consequently, increase of a load of decoding can be inhibited.

3. Second Embodiment

<Restriction on Tile Set>

As described above, in a case where a tile set is set by the MCTS SEI in coded data of a moving image before extraction, a partial area to be extracted can be easily extracted by setting the partial area on the basis of that tile set.

Figure 22:
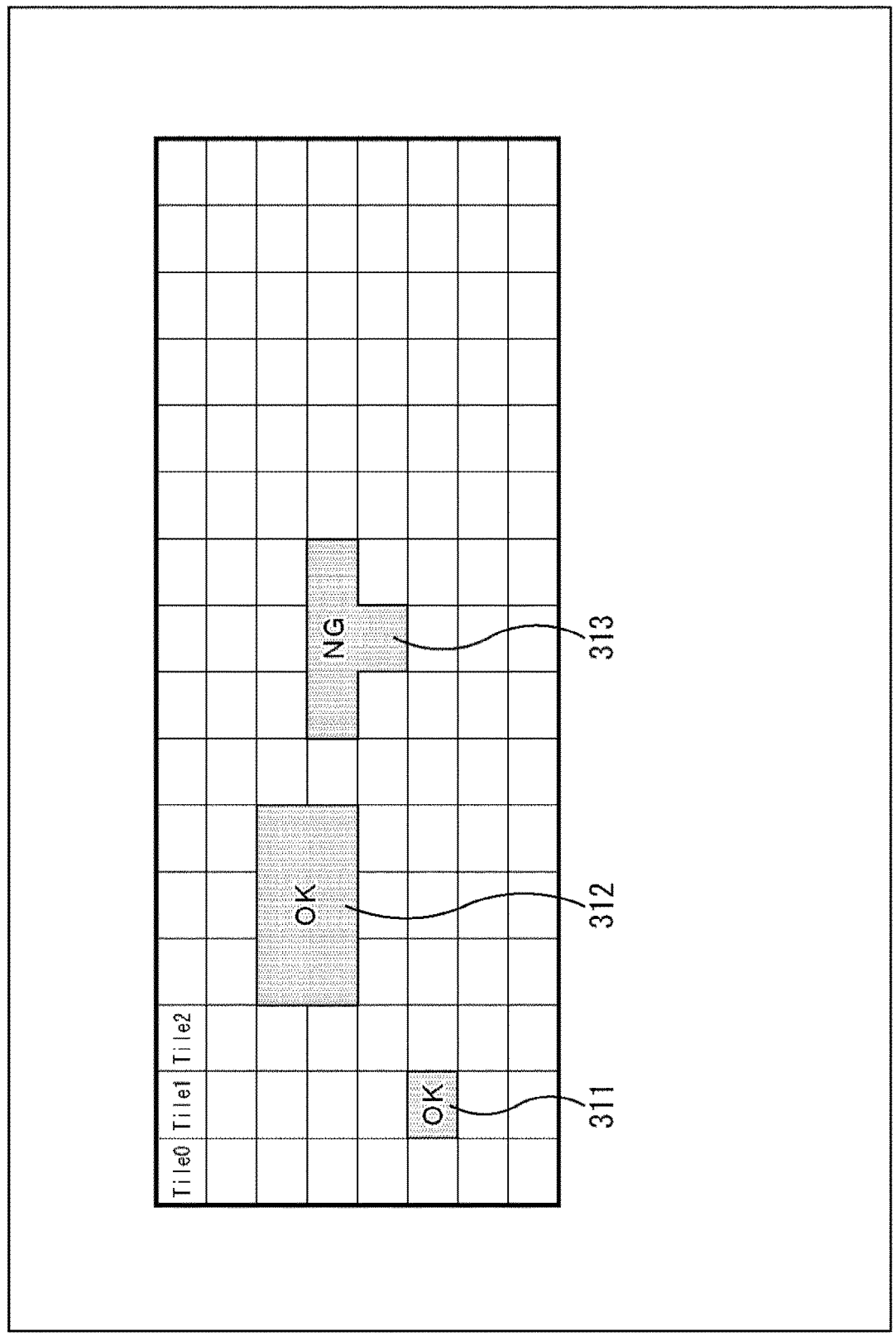
FIG. 22 illustrates an example of a restriction on a tile set to be extracted.

Note, however, that the tile set may be set on the basis of a tile, and the tile set may have a non-rectangular shape. In contrast, the picture is required to have a rectangular shape. Consequently, in a case where a partial area is extracted on the basis of such a tile set, the partial area having a rectangular shape as, for example, tile sets 311 and 312 illustrated in FIG. 22 can be used as a picture as it is. An extracted non-rectangular partial area as a tile set 313, however, cannot, be used as a picture as it is, and there has been a possibility of failure of the processing.

Consequently, the shape of a tile set to be extracted as a partial area may be limited to rectangular. That is, only coded data of a rectangular partial area may be extracted. FIG. 23 illustrates an example of a syntax of a part of the MCTS SEI. Only in a case where the value of the parameter mc_all_tiles_exact-sample_value_match_flag included in such MCTS SEI is "1", or the value of num_tile_rects_in_set_minus1 [i] is 0, a partial area to be extracted is set to be able to include the tile set.

This setting enables more reliable data conversion.

Figure 24:
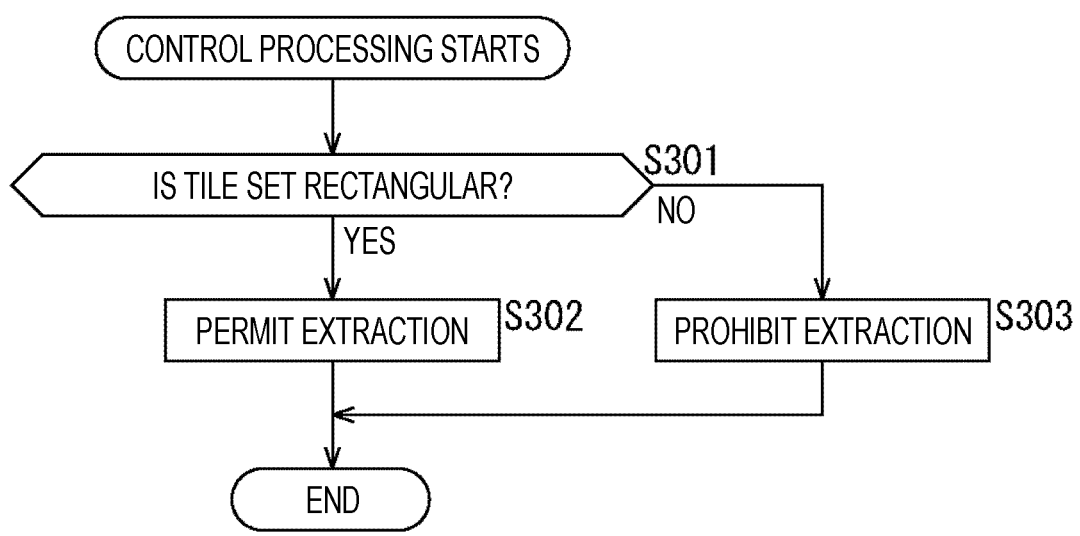
FIG. 24 is a flowchart illustrating an example of a flow of control processing.

In that case, the extracted tile specifying unit 112 executes control processing to implement such control. An example of the flow of the control processing will be described with reference to the flowchart of FIG. 24.

When the control processing is started, the extracted tile specifying unit 112 determines whether or not a tile set is rectangular in step S301. In a case of determination of being rectangular, the processing proceeds to step S302. In step S302, the extracted tile specifying unit 112 permits extraction of the rectangular tile set. The partial area to be extracted can include the tile set permitted to be extracted in such a way. When the processing in step S302 is finished, the control processing is finished.

Furthermore, in a case where a tile set is determined to be non-rectangular in step S301, the processing proceeds to step S303. In step S303, the extracted tile specifying unit 112 prohibits extraction of the non-rectangular tile set. The partial area to be extracted cannot include the tile set prohibited from being extracted in such a way. When the processing in step S303 is finished, the control processing is finished.

The control processing as described above enables extraction of only a rectangular tile set, thereby allowing more reliable data conversion.

<Treatment of Tile Set>

Figure 25:
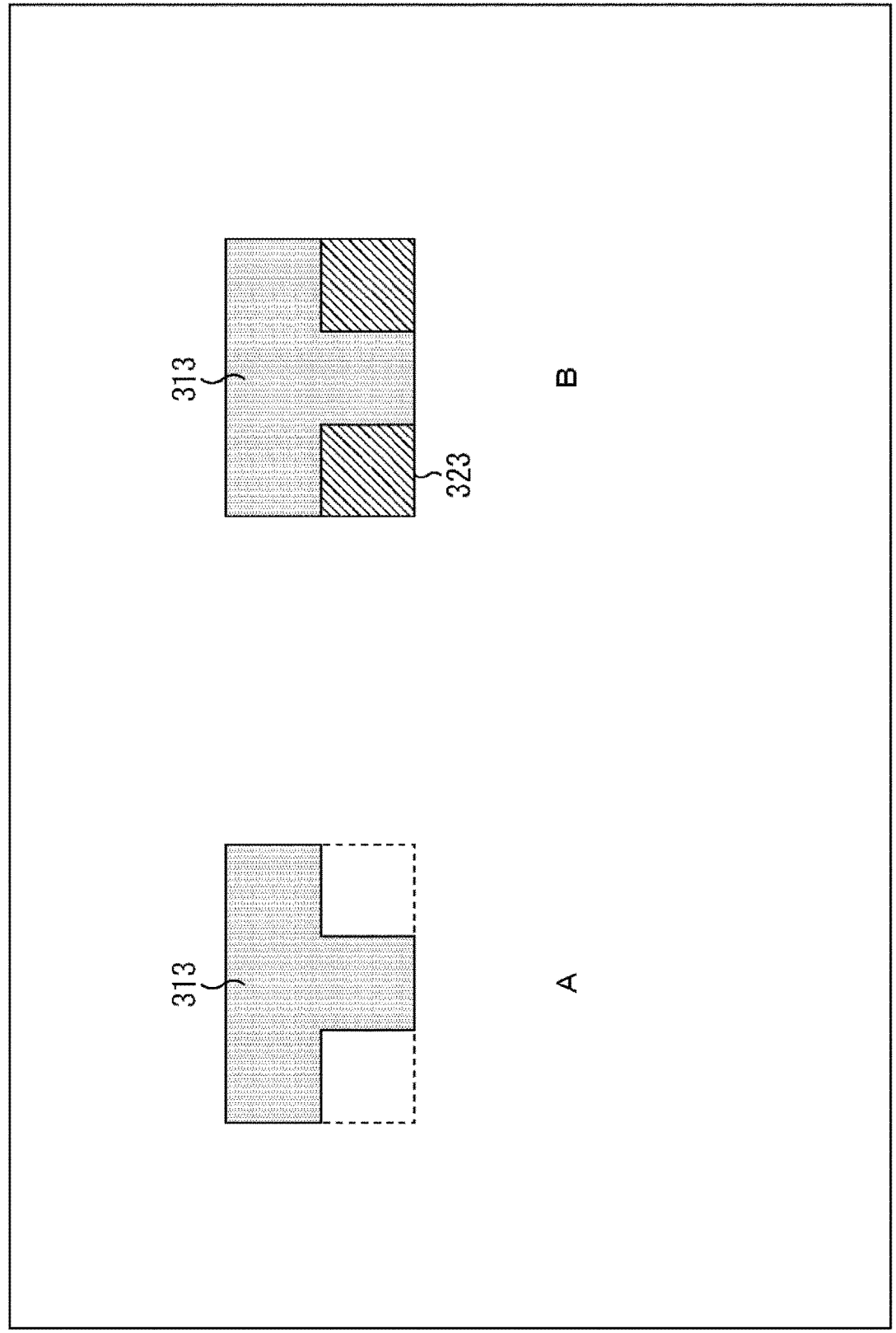
FIG. 25 illustrates an example of how to make a tile set rectangular.

Note that, instead of prohibiting extraction, a non-rectangular tile set may be made rectangular after extraction (extracted coded data is updated so that the partial area is made rectangular). For example, the tile set 313 illustrated in A of FIG. 25 is non-rectangular. As illustrated in B of FIG. 25, the tile set can be made rectangular by supplementing a part surrounded by a dotted line with some information. In a case of B of FIG. 25, the tile set 313 is supplemented with supplementary data 323 (hatched part so as to be rectangular.

Any data may constitute the supplementary data 323. For example, empty coded data such as a skip block may be used, or the supplementary data may be generated by encoding the area again. Note that any method of being made rectangular is adopted, and a method other than performing supplement with data may be adopted.

Figure 26:
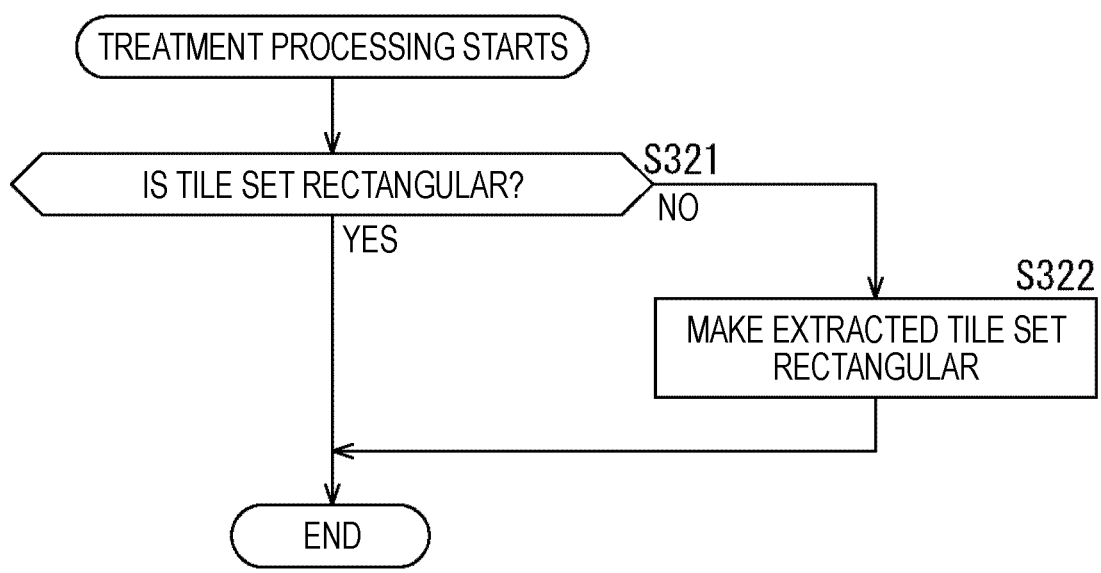
FIG. 26 is a flowchart illustrating an example of a flow of the control processing.

In this case, for example, the data extracting unit 113 executes treatment processing to make the extracted tile set rectangular. An example of the flow of the treatment processing in that case will be described with reference to the flowchart of FIG. 26.

When the treatment processing is started, the data extracting unit 113 determines in step S321 whether or not the extracted tile set is rectangular. In a case of determination of being rectangular, the treatment processing is finished. That is, the extracted rectangular tile set is used as it is for generating a bitstream.

Furthermore, in a case where the extracted tile set is determined to be non-rectangular in step S321, the processing proceeds to step S322. In step S322, the data extracting unit 113, for example, performs supplementing with data to make the extracted non-rectangular tile set rectangular. That is, the tile set made rectangular is used for generating the bitstream. When the processing in step S322 is finished, the treatment processing is finished.

The treatment processing as described above enables all of the extracted tile sets to be rectangular, thereby allowing more reliable data conversion.

4. Others

<Update Metadata>

Note that any metadata may be updated, and metadata to be updated is not limited to the above-described example. Furthermore, metadata corresponds to any data basis. For example, the metadata may correspond to one of transform unit (TU), transform block (TB), prediction unit (PU), prediction block (PB), coding unit (CU), largest coding unit (LCU), sub block, block, tile, slice, picture, sequence, and component. The metadata may correspond to another data basis. Furthermore, the metadata is stored in any storage place.

<Coding/Decoding Method>

Although, in the above description, a coding/decoding method has been described in the example of the HEVC, the present technology can be applied to any image coding/decoding method as long as the method can form an independently decodable partial area.

For example, the present technology can also be applied to a multi-viewpoint image coding/decoding system and a hierarchical image coding (scalable coding)/decoding system. The multi-viewpoint image coding/decoding system codes/decodes a multi-view image including an image with a plurality of viewpoints (views). The hierarchcal image coding (scalable coding)/decoding system codes/decodes a hierarchical image that is multi-layered (hierarchized) so as to have a scalability function for a predetermined parameter.

<Application Field of the Present Technology>

The present technology can be applied to, for example, systems, apparatuses, and processing units that process images and are used in any field such as, for example, traffic, medical care, crime prevention, agriculture, livestock industry, mining, beauty, factory, household appliance, weather, and natural surveillance.

For example, the present technology can also be applied to a system and a device used in viewing. Furthermore, for example, the present technology can also be applied to a system and a device used in traffic management. Moreover, for example, the present technology can also be applied to a system and a device used in security. Furthermore, for example, the present technology can also be applied to a system and a device used in sports. Moreover, for example, the present technology can also be applied to a system and a device used in agriculture. Furthermore, for example, the present technology can also be applied to a system and a device used in livestock industry. Moreover, for example, the present technology can also be applied to a system and a device for monitoring environmental conditions such as, for example, volcanoes, forests, and oceans. Furthermore, the present technology can be applied to a weather observation system and a weather observation apparatus for observing, for example, weather, temperature, humidity, wind speed, sunshine duration, and the like. Moreover, the present technology can also be applied to, for example, a system and a device for observing ecology of wildlife such as, for example, birds, fish, reptiles, amphibians, mammals, insects, and plants.

<Computer>

The above-described series of processing can be executed by hardware or software. In a case where the series of processing is executed by software, a program constituting the software is installed in a computer. The computer here includes, for example, a computer incorporated in dedicated hardware and, for example, a general-purpose personal computer capable of executing various functions by installing various programs.

Figure 27:
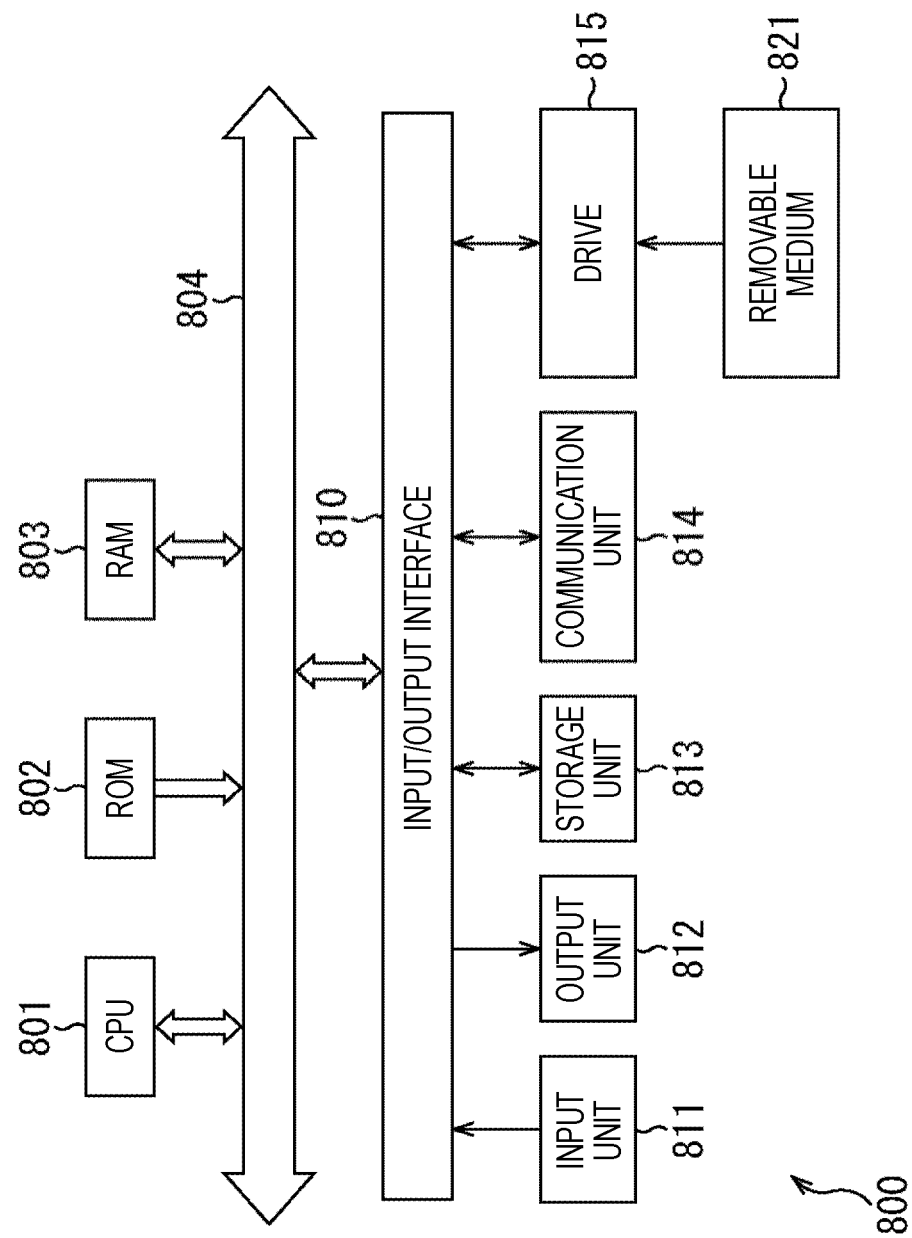
FIG. 27 is a block diagram illustrating a main configuration example of a computer.

FIG. 27 is a block diagram illustrating a configuration example of hardware of a computer that executes the above-described series of processing by using a program.

In a computer 800 illustrated in FIG. 27, a central processing unit (CPU) 801, a read only memory (ROM) 802, and a random access memory (RAM) 803 are connected to each other via a bus 804.

An input/output interface 810 is also connected to the bus 804. An input unit 811, an output, unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAN disk, a nonvolatile memory, and the like. The communication unit 814 includes, for example, a network interface. The drive 815 drives a removable medium 821 such as a magnetic disk, an optical disk, a magneto-optical disk, and a semiconductor memory.

In the computer formed as described above, the above-described series of processing is performed by the CPU 801 loading, for example, a program stored in the storage unit 813 in the RAN 803 via the input/output interface 810 and the bus 804 and executing the program. For example, data necessary for the CPU 801 to execute various pieces of processing is appropriately stored also in the RAN 803.

A program to be executed by the computer (CPU 801) can be applied by, for example, being recorded in the removable medium 821 serving as a package medium and the like. In that case, the program can be installed in the storage unit 813 via the input/output interface 810 by mounting the removable medium 821 in the drive 815. Furthermore, the program can also be provided via a wired or wireless transmission medium such as a local area network, the Internet, and digital satellite broadcasting. In that case, the program can be received at the communication unit 814, and installed in the storage unit 813. In addition, the program can be installed in the ROM 802 and the storage unit 813 in advance.

Note that a part of the above-described series of processing can be executed by hardware and the other part can be executed by software.

<Application of Present Technology>

The data conversion apparatus 100 according to the above-described embodiment can be applied to various electronic appliances. For example, the electronic appliances include senders, receivers, recording apparatuses, reproduction apparatuses, and the like. The senders and receivers are used in, for example, satellite broadcasting, wired broadcasting such as cable TV, distribution over the Internet, distribution to a terminal by cellular communication. The recording apparatuses record an image in a medium such as an optical disk, a magnetic disk, and a flash memory. The reproduction apparatuses reproduce the image from these storage media.

For example, the present technology can also be applied to a network system including a plurality of apparatuses. FIG. 28 illustrates one example of a schematic configuration of a network system to which the present technology is applied.

In a network system 1600 illustrated in FIG. 28, appliances communicate information regarding an image (moving image) via a network. A cloud service 1601 of the network system 1600 provides services regarding an image (moving image) to a terminal such as a computer 1611, an audio visual (AV) appliance 1612, a portable information processing terminal 1613, and an internet of things (IoT) device 1614. The computer 1611 is communicably connected to the cloud service 1601. For example, the cloud service 1601 provides a terminal with a supply service of content of an image (moving image), such as so-called moving image distribution (on-demand and live distribution). Furthermore, for example, the cloud service 1601 provides a backup service for receiving content of an image (moving image) from a terminal and storing the content. Furthermore, for example, the cloud service 1601 provides a service for mediating communication of content of an image (moving image) between terminals.

The cloud service 1601 adopts any physical configuration. For example, the cloud service 1601 may include various servers and any network. The various servers include, for example, servers for storing and managing moving images, servers for distributing moving images to terminals, servers for acquiring moving images from terminals, and servers for managing users (terminals) and billing. Any network includes, for example, the Internet and LAN.

The computer 1611 includes an information processing apparatus, for example, a personal computer, a server, a workstation, and the like. The AV appliance 1612 includes an image processing apparatus, for example, a television image receiver, a hard disk recorder, a game appliance, a camera, and the like. The portable information processing terminal 1613 includes a portable information processing apparatus, for example, a notebook personal computer, a tablet terminal, a mobile phone, a smartphone, and the like. The IoT device 1614 includes any object that performs processing regarding images, for example, a machine, a home appliance, furniture, another object, an IC tag, a card type device, and the like. Each of these terminals has a communication function, is connected to the cloud service 1601 (session is established), and can communicate information (i.e., perform communication) with the cloud service 1601. Furthermore, each terminal can also communicate with another terminal. Communication between the terminals may be performed via the cloud service 1601, or may be performed without using the cloud service 1601.

In the network system 1600 as described above, the present technology may be applied in a case where coded data of a moving picture is communicated between terminals or between a terminal and the cloud service 1601.

For example, in a case where a sending destination of a moving image needs only data of a partial area of the moving image, a sending source (sending side) may convert coded data of the moving image into coded data of the partial area, and send the converted coded data to the sending destination, as described in each embodiment. This configuration enables reduction in an amount of codes to be transmitted compared to that in a case where data of a moving image before conversion is transmitted. That is, transmission of data unnecessary for the sending destination can be inhibited, and thus the increase of a load regarding sending of coded data at the sending source, such as a processing amount, a buffer amount, and a processing duration, can be inhibited. Furthermore, reduction of the amount of codes to be transmitted can inhibit increase of the bandwidth occupancy and the occupation duration of a transmission medium due to transmission of the coded data. That increase of a load on a transmission medium (e.g., network) can be inhibited. Furthermore, an amount of codes to be received at the sending destination can be reduced, and thus the increase of a load regarding reception of coded data at the sending destination, such as a processing amount, a buffer amount, and a processing duration, can be inhibited. Moreover, application of the present technology enables transmission of an appropriate bitstream for a partial area, thereby allowing inhibition of increase of a load of decoding.

Note that generation of the coded data of the partial area (conversion of the coded data) is required to be performed before decoding of the coded data. For example, the conversion of the coded data may be performed at the sending destination (receiving side). That is, the coded data of the moving image before conversion may be transmitted, and the present technology may be applied at the sending destination. As described in each embodiment, the coded data of the received moving image may converted into coded data of a desired partial area, and the coded data of the partial area after the conversion may be decoded. Such configuration enables inhibition of increase of a load of decoding.

Note that, of course, the sending destination (receiving side) may send the coded data of the partial area after conversion to others (another terminal or the cloud service

1601). Furthermore, the sending source (sending side) and the sending destination (receiving side) described above may be the above-described terminal or the cloud service 1601.

<Supplement>

Note that various pieces of information (e.g., metadata) regarding coded data (bitstream) may be transmitted or recorded in any form as long as being associated with the coded data. The term "associate" here means, for example, that, in a case where one piece of data is processed, the other data can be used (linked). That is, pieces of data associated with each other may be put together as one piece of data, or may be used as an individual piece of data. For example, information associated with coded data (image) may be transmitted on a transmission path different from that for the coded data (image). Furthermore, for example, the information associated with coded data (image) may be recorded in a recording medium different from that for the coded data (image) (or in another recording area of the same recording medium). Note that this "association" may be performed not for the entire data, but for a part of data. For example, an image and information corresponding to the image may be associated with each other in any basis such as a plurality of frames, one frame, and a part in a frame.

Furthermore, in the specification, the terms such as "synthesize", "multiplex", "add", "integrate", "include", "store", "enter", "inlet", and "insert" mean putting a plurality of objects into one, for example, putting coded data and metadata into one piece of data, and mean one method of the above-described "associate".

Furthermore, embodiments of the present technology are not limited to the above-described embodiments, and various modifications are possible without, departing from the gist of the present technology.

Furthermore, for example, the present technology can be implemented as all configurations constituting an apparatus or a system, for example, such as processors serving as system large scale integration (LSI) and the like, modules using the plurality of processors and the like, units using the plurality of modules and the like, and sets obtained by further adding another function to the units (i.e., part of the configuration of an apparatus).

Note that, in the specification, a system means a collection of a plurality of components (e.g., apparatuses and modules (parts)), and it does not matter whether or not all the components are in the same housing.

Consequently, both of a plurality of apparatuses accommodated in different housings and connected via a network, and one apparatus having a plurality of modules accommodated in one housing are systems.

Furthermore, for example, a configuration described as one apparatus (or a processing unit) may be divided into a plurality of apparatuses (or processing units). In contrast, a configuration described as a plurality of apparatuses (or processing units) in the above description may be put into one apparatus (or a processing unit). Furthermore, of course, a configuration other than the above-described configurations may be added to the configuration of each apparatus (or each processing unit). Furthermore, a part of the configuration of a certain apparatus (or a processing unit) may be included in the configuration of another apparatus (or another processing unit) as long as the configuration and operation of the system as a whole are substantially the same.

Furthermore, for example, the present technology can have a configuration of cloud computing in which a plurality of apparatuses shares one function via a network and performs processing together.

Furthermore, for example, the above-described program can be executed in any apparatus. In that case, that apparatus is required to have a necessary function (e.g., function block) to obtain necessary information.

Furthermore, in addition to being executed by one apparatus, each step described in the above-described flowchart can be shared and executed by a plurality of apparatuses. Moreover, in a case where one step includes a plurality of pieces of processing, the plurality of pieces of processing included in that one step can be shared and executed by a plurality of apparatuses in addition to being executed by one apparatus. In other words, a plurality of pieces of processing included in one step can be executed as pieces of processing of a plurality of steps. Conversely, pieces of processing described as a plurality of steps can be collectively executed as one step.

Note that, in a program executed by a computer, pieces of processing of steps describing the program may be chronologically executed along the order described in the specification, or may be separately executed in parallel at necessary timing when, for example, calling is performed. That is, as long as inconsistency does not arise, the processing of each step may be executed in an order different from the above-described order. Furthermore, the processing of the step describing this program may be executed in parallel with the processing of another program, or may be executed in combination with the processing of another program.

Note that, each of the plurality of present technologies described in the specification can be independently performed alone as long as inconsistency does not arise. Of course, an optional plurality of present technologies can be implemented together. For example, a part or all of the present technology described in one of the embodiments can be implemented in combination with a part or all of the present technology described in the other embodiment. Furthermore, a part or all of any of the above-described present technologies can be implemented together with other technologies that are not described above.

Note that the present technology can also have the configuration as follows.

(1) An image processing apparatus including a metadata updating unit that updates metadata extracted from coded data of a moving image in accordance with coded data of a partial area of the moving image extracted from the coded data of the moving image.

(2) The image processing apparatus according to (1), in which the metadata updating unit updates slice-basis metadata corresponding to each slice included in the partial area.

(3) The image processing apparatus according to (2), in which the metadata updating unit updates information, regarding an address of the slice, contained in the slice-basis metadata.

(4) The image processing apparatus according to (2) or (3), in which the metadata updating unit updates information, regarding an offset of a tile, contained in the slice-basis metadata in response to change of a tile configuration in the slice.

(5) The image processing apparatus according to any one of (2) to (4), in which the metadata updating unit adds or deletes the slice-basis metadata in response to change of a slice configuration in a picture.

(6) The image processing apparatus according to any one of (1) to (5), in which the metadata updating unit updates picture-basis metadata.

(7) The image processing apparatus according to (6), in which the metadata updating unit updates information, regarding a tile set, contained in the picture-basis metadata in response to change of a tile configuration in an independently decodable tile set.

(8) The image processing apparatus according to (6) or (7), in which the metadata updating unit updates information, regarding a tile configuration in a tile set, contained in the picture-basis metadata in response to change of a tile configuration in an independently decodable tile set.

(9) The image processing apparatus according to any one of (1) to (8), in which the metadata updating unit updates upper metadata equal to or greater than a sequence level.

(10) The image processing apparatus according to (9), in which the metadata updating unit updates information, regarding an image frame, contained in the upper metadata in accordance with a size of the partial area.

(11) The image processing apparatus according to any one of (1) to (10), in which the metadata updating unit deletes metadata regarding an independently decodable tile set.

(12) The image processing apparatus according to any one of to (11), further including a metadata extracting unit that extracts metadata from coded data of the moving image, in which the metadata updating unit updates the metadata extracted by the metadata extracting unit.

(13) The image processing apparatus according to (12), in which the metadata extracting unit extracts upper metadata equal to or greater than a sequence level.

(14) The image processing apparatus according to (12) or (13), in which the metadata extracting unit extracts picture-basis metadata.

(15) The image processing apparatus according to any one of (12) to (14), further including a data extracting unit that extracts coded data of the partial area from coded data of the moving image, in which the metadata updating unit updates metadata contained in coded data of the partial area extracted by the data extracting unit.

(16) The image processing apparatus according to (15), in which the metadata updating unit updates slice-basis metadata contained in coded data of the partial area.

(17) The image processing apparatus according to (15) or (16), in which the data extracting unit extracts coded data of an independently decodable partial area.

(18) The image processing apparatus according to (17), in which the data extracting unit extracts coded data of the partial area only in a case where the partial area is rectangular.

(19) The image processing apparatus according to (17) or (18), in which, in a case where the partial area is non-rectangular, the data extracting unit updates extracted coded data to make the partial area rectangular.

(20) An image processing method including updating metadata extracted from coded data of a moving image in accordance with coded data of a partial area of the moving image extracted from the coded data of the moving image.

REFERENCE SIGNS LIST

100 Data conversion apparatus
111 Metadata extracting unit
112 Extracted tile specifying unit
113 Data extracting unit
114 Metadata updating unit
115 Bitstream generating unit
800 Computer
1600 Network system
1601 Cloud service
1611 Computer
1612 AV appliance
1613 Portable information processing terminal
1614 IoT device

The invention claimed is:

1. An image decoding apparatus comprising at least one processor configured to:

receive a first bitstream of coded data indicating a first moving image;

acquire, from the first bitstream, supplemental enhancement information (SEI) specifying an independently decodable tile set;

update, based on the SEI, at least one of a video parameter set (VPS), a sequential parameter set (SPS) or a picture parameter set (PPS) contained in the first bitstream to correspond to a partial area of the moving image including the independently decodable tile set; and extract a second bitstream indicating a second moving image smaller than the first moving image, and including at least one of the updated VPS, the updated SPS or the updated PPS to satisfy at least one of a profile or a level different from that of the first bitstream.

2. The image decoding apparatus according to claim 1, wherein the at least one processor is further configured to acquire, as the SEI, motion constrained tile set SEI (MCTS SEI) from the first bitstream.

3. The image decoding apparatus according to claim 2, wherein the MCTS SEI includes at least one parameter setting a shape of the independently decodable tile set to a rectangular shape, and the at least one processor is further configured to decode the second bitstream to acquire the partial area to have the rectangular shape.

4. The image decoding apparatus according to claim 1, wherein the at least one processor is further configured to decode the second bitstream to acquire the second moving image without decoding the first bitstream.

5. The image decoding apparatus according to claim 1, wherein the at least one of the profile or the level conforms to High Efficiency Video Coding (HEVC).

6. An image decoding method comprising:

receiving a first bitstream of coded data indicating a first moving image;

acquiring, from the first bitstream, supplemental enhancement information (SEI) specifying an independently decodable tile set;

updating, based on the SEI, at least one of a video parameter set (VPS), a sequential parameter set (SPS) or a picture parameter set (PPS) contained in the first bitstream to correspond to a partial area of the moving image including the independently decodable tile set; and extracting a second bitstream indicating a second moving image smaller than the first moving image, and including at least one of the updated VPS, the updated SPS or the updated PPS to satisfy at least one of a profile or a level different from that of the first bitstream.

7. A non-transitory computer-readable medium having embodied thereon a program, which when executed by a computer causes the computer to execute an image decoding method, the method comprising:

receiving a first bitstream of coded data indicating a first moving image;

acquiring, from the first bitstream, supplemental enhancement information (SEI) specifying an independently decodable tile set;

updating, based on the SEI, at least one of a video parameter set (VPS), a sequential parameter set (SPS) or a picture parameter set (PPS) contained in the first bitstream to correspond to a partial area of the moving image including the independently decodable tile set; and extracting a second bitstream indicating a second moving image smaller than the first moving image, and including at least one of the updated VPS, the updated SPS or the updated PPS to satisfy at least one of a profile or a level different from that of the first bitstream.

* * * * *